United States Patent
Uhling et al.

(10) Patent No.: US 10,554,369 B2
(45) Date of Patent: Feb. 4, 2020

(54) GROUP ACKNOWLEDGEMENT MESSAGE EFFICIENCY

(71) Applicant: Itron, Inc., Liberty Lake, WA (US)

(72) Inventors: Thomas Uhling, Spokane Valley, WA (US); Keith Barnes, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 165 days.

(21) Appl. No.: 15/395,633

(22) Filed: Dec. 30, 2016

(65) Prior Publication Data

US 2018/0191478 A1 Jul. 5, 2018

(51) Int. Cl.
H04L 5/00 (2006.01)
H04W 52/02 (2009.01)
H04W 4/70 (2018.01)

(52) U.S. Cl.
CPC ....... *H04L 5/0055* (2013.01); *H04W 52/0209* (2013.01); *H04W 4/70* (2018.02)

(58) Field of Classification Search
None
See application file for complete search history.

(56) References Cited

U.S. PATENT DOCUMENTS

| | | |
|---|---|---|
| 9,125,132 B1 | 9/2015 | Rai et al. |
| 2002/0097681 A1 | 7/2002 | Treister et al. |
| 2002/0168945 A1 | 11/2002 | Hwang et al. |
| 2003/0135640 A1* | 7/2003 | Ho .................. H04L 1/1621 709/237 |
| 2005/0149751 A1 | 7/2005 | Ochi et al. |
| 2007/0120705 A1 | 5/2007 | Kiiskila et al. |
| 2007/0253391 A1 | 11/2007 | Shao et al. |
| 2007/0260851 A1 | 11/2007 | Taha et al. |
| 2008/0051036 A1 | 2/2008 | Vaswani et al. |
| 2008/0068217 A1 | 3/2008 | Van Wyk et al. |
| 2008/0095075 A1 | 4/2008 | Monier |
| 2008/0107156 A1 | 5/2008 | Wentick et al. |
| 2008/0310311 A1 | 12/2008 | Flammer et al. |

(Continued)

FOREIGN PATENT DOCUMENTS

| | | |
|---|---|---|
| EP | 2393231 | 12/2011 |
| EP | 3021494 | 5/2016 |
| WO | WO2016014969 | 1/2016 |

OTHER PUBLICATIONS

PCT Invitation to Pay Additional Fees dated Dec. 5, 2017 for PCT Application No. PCT/US17/54062, 22 pages.

(Continued)

*Primary Examiner* — Jeffrey M Rutkowski
*Assistant Examiner* — Mehedi S Aley
(74) *Attorney, Agent, or Firm* — Lee & Hayes, P.C.

(57) ABSTRACT

Techniques for acknowledging communications from multiple devices are described herein. For example, a device may broadcast a group acknowledgement message indicating that communications from multiple devices have been received by the device. Each acknowledgement in the group acknowledgement message may include a device identifier for a device that sent a communication (e.g., a Medium Access Control (MAC) address of the device, a hash of the MAC address of the device, etc.) and a communication identifier for the communication (e.g., a sequence number of the communication, a Cyclic Redundancy Check (CRC) code for the communication, etc.).

19 Claims, 29 Drawing Sheets

(56) References Cited

U.S. PATENT DOCUMENTS

| | | |
|---|---|---|
| 2008/0310377 A1 | 12/2008 | Flammer et al. |
| 2009/0043911 A1 | 2/2009 | Flammer et al. |
| 2009/0074033 A1 | 3/2009 | Kattwinkel |
| 2009/0168846 A1 | 7/2009 | Filippo, III et al. |
| 2009/0262675 A1 | 10/2009 | Tsai, Jr. |
| 2010/0128679 A1 | 5/2010 | Kwon |
| 2010/0226343 A1 | 9/2010 | Hsu et al. |
| 2010/0290419 A1 | 11/2010 | Wengerter |
| 2011/0038290 A1 | 2/2011 | Gong et al. |
| 2011/0069650 A1 | 3/2011 | Singh et al. |
| 2011/0069689 A1 | 3/2011 | Grandhi et al. |
| 2011/0134852 A1 | 6/2011 | Cordeiro |
| 2011/0182245 A1 | 7/2011 | Malkamaki et al. |
| 2011/0199952 A1 | 8/2011 | Seok |
| 2012/0158933 A1 | 6/2012 | Shetty et al. |
| 2012/0177013 A1 | 7/2012 | Trainin et al. |
| 2013/0003662 A1 | 1/2013 | Lee et al. |
| 2013/0016758 A1 | 1/2013 | Hui et al. |
| 2013/0022084 A1 | 1/2013 | Vasseur et al. |
| 2013/0094536 A1 | 4/2013 | Hui et al. |
| 2013/0227689 A1 | 8/2013 | Pietrowicz et al. |
| 2014/0010078 A1* | 1/2014 | Droste .............. H04W 28/0289 370/230 |
| 2014/0105082 A1 | 4/2014 | Sinha |
| 2014/0167979 A1 | 6/2014 | Soma et al. |
| 2014/0376441 A1 | 12/2014 | Lohmar et al. |
| 2014/0376567 A1 | 12/2014 | Hui et al. |
| 2015/0030036 A1 | 1/2015 | Wang et al. |
| 2015/0043384 A1 | 2/2015 | Hui et al. |
| 2015/0188935 A1 | 7/2015 | Vasseur et al. |
| 2015/0382283 A1 | 12/2015 | Wang et al. |
| 2016/0021596 A1 | 1/2016 | Hui et al. |
| 2016/0021612 A1 | 1/2016 | Matsunaga et al. |
| 2016/0026542 A1 | 1/2016 | Vasseur et al. |
| 2016/0037449 A1 | 2/2016 | Kandhalu Raghu et al. |
| 2016/0066249 A1 | 3/2016 | Dukes et al. |
| 2016/0088534 A1 | 3/2016 | Axmon et al. |
| 2016/0105900 A1 | 4/2016 | Zhang et al. |
| 2016/0128097 A1 | 5/2016 | Pajukoski et al. |
| 2016/0134539 A1 | 5/2016 | Hui et al. |
| 2016/0150501 A1 | 5/2016 | Hui et al. |
| 2016/0212698 A1 | 7/2016 | Guo et al. |
| 2016/0219512 A1 | 7/2016 | Asterjadhi et al. |
| 2016/0353253 A1* | 12/2016 | Cherian ................. H04L 5/0055 |
| 2017/0041868 A1 | 2/2017 | Palin et al. |
| 2017/0048048 A1* | 2/2017 | Seok ..................... H04L 5/0055 |
| 2017/0135122 A1 | 5/2017 | Elliott |
| 2017/0164382 A1 | 6/2017 | Liu et al. |
| 2017/0338867 A1* | 11/2017 | Chu ........................ H04J 11/00 |
| 2017/0339733 A1* | 11/2017 | Kurian .................. H04W 76/23 |
| 2018/0124479 A1 | 5/2018 | Taylor et al. |
| 2018/0124589 A1 | 5/2018 | Bartier et al. |
| 2018/0124785 A1 | 5/2018 | Taylor et al. |

OTHER PUBLICATIONS

PCT Search Report and Written Opinion dated Dec. 15, 2017 for PCT application No. PCT/US2017/054027, 28 pages.

PCT Search Report and Written Opinion dated Dec. 18, 2017 for PCT application No. PCT/US2017/054049, 32 pages.

Office action for U.S. Appl. No. 15/395,847, dated Jun. 27, 2017, Taylor, "Events and Scheduling for Communcation in Wireless Networks ", 12 pages.

Office action for U.S. Appl. No. 15/395,743, dated Apr. 20, 2017, Taylor, "Channel Structure for Communication in Wireless Networks", 8 pages.

PCT Search Report and Written Opinion dated Mar. 22, 2018 for PCT application No. PCT/US2017/067895, 15 pages.

PCT Search Report and Written Opinion dated Jan. 31, 2018 for PCT application No. PCT/US2017/054062, 26 pages.

* cited by examiner

| Octets: 2 | Octets: 1 | | Octets: 0/2 | Octets: 0 / Variable | | | |
|---|---|---|---|---|---|---|---|
| | Bits: 0-3 | 4-7 | | Bits: 0-2 | 3-5 | 6-7 | Octets: Variable |
| WP sub-IE Descriptor 2002 | Tag 2004 | Reference Tag 2006 | Future Transition Element Number 2008 | Channel Plan 2010 | PRG 2012 | Excluded Channel Control 2014 | Channel Information 2016 |

| Octets: 2 | Octets: 1 | | Octets: 0/2 | 0/6 | | 0/8 | |
|---|---|---|---|---|---|---|---|
| | Bits: 0-3 | 4-7 | | Octects: 2 | 4 | 4 | 4 |
| WP sub-IE Descriptor 2102 | Tag 2104 | Reference Tag 2106 | Future Transition Element Number 2108 | Schedule Active Period 2110 | Schedule RI 2112 | Reference SEB Element Number 2114 | Event Offset 2116 | Event RI 2118 |

| Octets: 2 | Octets: 1 | | Octets: 0/2 | 0/2 |
|---|---|---|---|---|
| | Bits: 0-3 | 4-7 | | |
| WP sub-IE Descriptor 2202 | Tag 2204 | Reference Tag 2206 | Future Transition Element Number 2208 | Seed 2210 |

| Octets: 2 | 1 | 1 | | 0/6 | |
|---|---|---|---|---|---|
| | | Bits: 0-3 | 4-7 | 2 | 4 |
| IE Descriptor 2302 | Sub ID 2304 | Frame Type 2306 | Tag 2308 | Element 2310 | FET 2312 |

FIG. 23

| Octets: 2 | 2 | 2 |
|---|---|---|
| WP sub-IE Descriptor 2602 | Number of FFDs 2604 | Number of LFDs 2608 |

| Octets: 2 | 2 | 1 | 2 | 2 |
|---|---|---|---|---|
| WP sub-IE Descriptor 2702 | Rank 2704 | Response Threshold 2706 | Response Interval 2708 | Response Period 2710 |

| Order ↓ | Frame → / IE ↓ | NDS | ND | LPCS | LPC | Data |
|---|---|---|---|---|---|---|
| 2 | TT | X | X | X | X | X |
| 2 | CH | X | X |  | X |  |
| 1 | DND | X |  |  |  |  |
| 1 | DTYPE | X | X |  |  |  |
| 2 | SCH | X | X | X | X | X |
| 2 | Seed | X | X |  |  |  |

FIG. 28

GROUP ACKNOWLEDGEMENT MESSAGE EFFICIENCY

BACKGROUND

Utility meters such as electric, water and gas meters have evolved from isolated devices that simply measure utility consumption and display a consumption reading to so called "smart meters" that are connected devices capable of reporting resource consumption readings automatically over a utility communication network. Some meters, such as electric meters, are powered by alternating current electricity service ("mains power") from the electricity grid. Other devices, such as many water and gas meters, are battery powered. In many cases, such battery powered devices are expected to operate for extended periods of time (twenty years or more) without being recharged.

The capabilities of smart meters are continuously growing. Many of the added capabilities of smart meters come with increased energy demands on the meter. However, battery technologies have not kept pace with the increased energy demands. For this reason, battery powered smart meters have not been able to adopt many of the new capabilities that have been possible for mains powered devices because doing so would shorten their battery life. Consequently, battery powered smart meters have had more limited functionality than their mains powered counterparts, and have been unable to join certain types of communication networks. Other battery powered devices have faced similar challenges of increasing functionality and communication ability without sacrificing battery life.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 20 illustrates an example channel information element (CH IE).

FIG. 21 illustrates an example schedule information element (SCH IE).

FIG. 22 illustrates an example Seed Information Element (Seed IE).

FIG. 23 illustrates an example Timing and Type Information Element (TT IE).

FIG. 26 illustrates an example Load Balancing Information Element (LB IE).

FIG. 27 illustrates an example Directed Network Discovery Information Element (DND IE).

FIG. 28 illustrates a chart that indicates examples when various information elements may be used.

DETAILED DESCRIPTION

Figure 1:
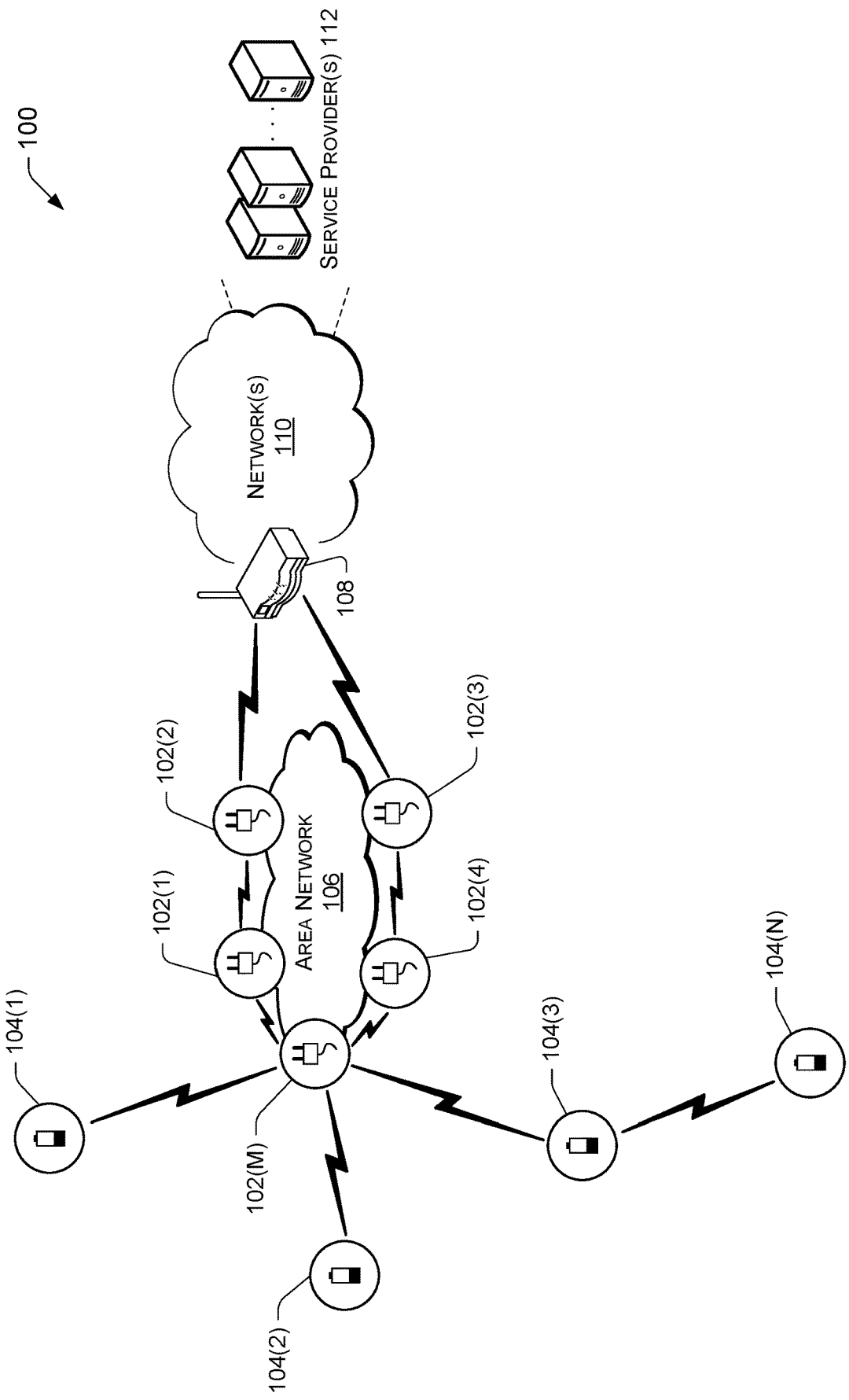
FIG. 1 is a schematic diagram of an example network architecture.

As discussed above, battery powered smart meters and other battery powered devices have been limited in their ability to provide desired functionality and connectivity without sacrificing battery life. This disclosure describes techniques to minimize the electricity consumption of limited function devices (e.g., battery powered devices) during network communications and performance of other functions. Further, this disclosure describes other techniques directed to limited function devices, full function devices (e.g., mains powered devices), and/or other types of devices. These and other techniques described herein may allow various devices to perform functions and communicate in ways that were not previously possible.

The techniques discussed herein may implement various information elements to establish communication with limited function devices, full function devices, and/or other types of devices. The information elements may include reduced amounts of data and/or different data than those used in previous techniques. For example, an information element may include data that is specific to a channel structure, schedule, seed, timing, and so on. Such information elements may provide a flexible structure for devices to selectively communicate information that is needed to establish channel plans or schedules, discover devices, acknowledge messages, or facilitate a variety of other functionality. That is, the information elements provide the flexibility to send some information without sending other information. Further, the information elements may be applicable to a wide variety of contexts (e.g., broadcast, multicast, unicast, etc.). In instances where battery powered devices are implemented, the techniques may, in many instances, minimize battery consumption by communicating less information, in comparison to previous techniques. Further, in instances where a parent-child relationship is implemented, the techniques provide a flexible structure to allow a parent node to control behavior of a child node(s) (or vice versa), such as establishing a communication schedule for the child node(s).

In some instances, an information element may reference previous data that has been sent, instead of including the data in the information element. This may minimize data traffic over a network. In one example, a first device may send an information element to a second device indicating that data for a first operating context (e.g., a broadcast service, multicast service, unicast service, etc.) that is already established on the second device may be used for a second operating context that has not yet been established on the second device. The second device may then associate the data from the first operating context with the second operating context. To illustrate, a schedule information element may indicate to establish a new broadcast schedule with schedule data from a unicast schedule that is already established on a device.

Further, in some instances an information element may include data to update an existing operating context. In one example, a first device may send an information element to a second device that includes just the data that is needed to update an operating context that is established on the second device. Here, the second device may update the operating context by applying the data from the information element to the operating context. To illustrate, a channel information element may be sent to a device to update a channel plan for an existing unicast schedule that is established for the device. The channel information element may include channel data to update the channel plan.

Moreover, in some instances an information element may indicate when to apply data to an operating context. In one example, a first device may send an information element to a second device requesting that the second device update an existing operating context at a particular schedule element in the future (e.g., at a future time). Here, the update may be a planned update (i.e., scheduled update). The information element may include or reference the data to use for the update. In any event, the data may be applied to the existing operating context at the particular schedule element.

As noted above, the information elements discussed herein may be used to implement a variety of functionality. In some illustrations, the information elements are used to establish communication schedules that conserve device and/or network resources. For example, a parent device in a wireless network may communicate with a child device to align the child device to a particular schedule (e.g., a schedule designated by the parent device and/or aligned to the parent device). This may allow the child device to enter a low power state associated with less than a threshold amount of power and awake when a communication is expected from the parent device. In instances where the child device is a battery powered device, the precise schedule may allow the child device to conserve battery life. Further, if the parent device is associated with multiple children devices, the parent device may designate separate schedules, or the same schedule, for the children devices. This may avoid communication collisions and/or unnecessary traffic on the wireless network. Further, such techniques may more efficiently enable devices to communicate over a network, in comparison to previous techniques that required a device to track its own timing and timing of neighboring devices.

Further, in some illustrations the information elements are used to discover a device within a wireless network in an efficient manner. For example, a first device may send a network discovery solicitation message to a second device to solicit a communication relationship (e.g., request connection to a parent). In many instances, a parent-child relationship may include a parent routing communications for a child (e.g., downlink communications for the child may be routed through the parent and uplink communication from the child may be routed through the parent). In many instances, the network discovery solicitation message may request that such parent-child relationship be established. Although in other instances, the network discovery solicitation message may be sent in other contexts. In any event, the network discovery solicitation may include one or more information elements that include information regarding a channel plan (e.g., a generator function associated with the first device, a channel list, etc.), information regarding a schedule of the first device, and/or information regarding a listening window during which the first device will be listening for communications.

The second device may use a channel function of the first device (which is based on the channel plan and schedule of the first device) to frequency hop and send a network discovery message to the first device during the listening window. The network discovery message may include one or more information elements indicating that the second device may be used as a parent to the first device. The network discovery message may also include an information element to establish a sampled schedule for the first device moving forward. If the second device is accepted as a parent, the first device may enter a low power state and/or awake state according to the sampled schedule.

In instances where the first device or the second device is a battery powered device, this discovery process may conserve battery life. For example, by designating a listening window where the first device and the second device may exchange information the first device and/or the second device may avoid constantly communication to establish a relationship. For example, by using a listening window, a device may avoid waiting relatively long periods of time to communicate with another device, as was done in previous techniques that use trickle timers. Further, by frequency hopping during the listening window, collisions between communications may be avoided.

Moreover, in some illustrations the information elements are used to acknowledge communications from multiple devices. For example, a device may acknowledge that communications from multiple devices have been received, by broadcasting a single group acknowledgement message. The group acknowledgement message may include one or more information elements that identify a list of acknowledgments. Each of the acknowledgements may include a device identifier for a device that sent a communication (e.g., a Medium Access Control (MAC) address of the device, a hash of the MAC address of the device, etc.) and a communication identifier for the communication (e.g., a sequence number of the communication, a Cyclic Redundancy Check (CRC) code for the communication, etc.). The acknowledgements may be formatted in various manners, which may be indicated by a type field in the group acknowledgment message. Acknowledgments of the same type may be grouped together.

In some instances, a group acknowledgement message may allow a relatively large number of communications (e.g., hundreds or thousands) to be acknowledged with relatively little information (e.g., a single message). This may be particularly useful for networks that designate a device to receive communications from many devices (e.g., a star network, etc.). Further, the techniques provide a flexible structure that allows various data formats to be used (e.g., smaller data formats in some instances, and larger data formats in others).

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, and so on. Unless specifically described to the contrary, the techniques described herein applicable to any communications network, control network, and/or other type of network or system.

In some examples, the techniques are implemented in the context of a standard, such as the Wireless Smart Utility Network (Wi-SUN) standard (e.g., Wi-SUN Field Area Network (Wi-SUN FAN)), IEEE 802.15.4-2015 (e.g., wireless mesh network), etc. Further, the techniques may be implemented in the context of the Internet of Things (IoT). As such, a wide variety of devices may be implemented.

By way of example and not limitation, network communication devices (sometimes referred to as nodes, computing devices, or just devices) include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, access points, portable navigation devices, portable gaming devices, portable media players, televisions, set-top boxes, computer systems in an automobile (e.g., navigation systems), cameras, robots, hologram systems, security systems, home-based computer systems (e.g., intercom systems, home media systems, etc.), projectors, automated teller machines (ATMs), and so on. In some instances, a network communication device may comprise a battery powered network communication device (also referred to as a "battery powered device") that relies on a battery for power (i.e., is not connected to mains power). In other instances, a network communication device (also referred to as a "mains powered device") may comprise a mains powered device that relies on mains power for electricity.

Example Environment

FIG. 1 is a diagram illustrating an example networked environment or architecture 100. The architecture 100 includes multiple network communication devices. The network communication devices include Full Function Devices (FFD) 102(1), 102(2), 102(3), 102(4), . . . 102(M) (collectively referred to as "FFDs 102"), and Limited Function Devices (LFDs) 104(1), 104(2), 104(3), . . . 104(N) (collectively referred to as "LFDs 104"), where M and N are any integers greater than or equal to 1 and may be the same number or different numbers. In some illustrations, the FFDs 102 include more functionality/resources than the LFDs 104. In one example, the FFDs 102 are implemented as mains powered devices (MPDs) that are connected to mains electricity (e.g., electricity meters), while the LFDs 104 are implemented as battery powered devices (BPDs) that are not connected to mains electricity (e.g., water meters, gas meters, etc. that employ batteries). However, in other examples, the FFDs 102 and LFDs 104 may have different processing power, processing capabilities, and so on. The techniques discussed herein may be implemented to communicate between FFDs 102, LFDs 104, or any combination of devices.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), Field Area Networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the area network 106 may comprise a star network, in which a central device acts a parent to one or more children devices. For example, the FFD 102(M) may act as a parent to the LFDs 104(1), 104(2), and 104(3). Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the LFDs 104 are implemented as leaf nodes. A leaf node may generally communicate with a parent node and not relay data for another node. As illustrated in FIG. 1, the LFDs 104(1) and 104(2) act as leaf nodes, with the FFD 102(M) being the parent node. However, in other examples the LFDs 104 may relay data for other nodes. For instance, the LFD 104(3) may relay data for the LFD 104(N). Further, any type of device may be implemented as a leaf node (e.g., any of the FFDs 102).

The network communication devices also include an edge device 108, which serves as a connection point of the AN 106 to one or more networks 110 (e.g., a backhaul network), such as the Internet. The edge device 108 may include, but is not limited to, a field area router (FAR), a cellular relay, a cellular router, an edge router, a DODAG (Destination Oriented Directed Acyclic Graph) root, a root device or node of the AN, a combination of the foregoing, or the like. In this illustrated example, the edge device 108 comprises a FAR, which relays communions from the AN 106 to one or more service providers 112 via the network(s) 110.

In some instances, the one or more service providers 112 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the one or more service providers 112 comprise other systems to implement other functionality, such as web services, cloud services, and so on. In yet other instances, the one or more service providers 112 may be implemented as other types of devices, such as in the context of the Internet of Things (IoT) that allows a variety of devices to exchange data.

The one or more service providers 112 may be physically located in a single central location, or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, an LFD may connect to a network by connecting directly with an FFD. To illustrate, a battery powered water meter, for example, the LFD 104(1), discovers in its vicinity an electricity meter, the FFD 102(M), connected to mains power. Because the FFD 102(M) is connected to mains power, it has no practical energy constraints. The LFD 104(1) may associate the FFD 102(M) as its parent, in which case the FFD 102(M) acts as the connecting point between the LFD 104(1) and the one or more service providers 112.

In other instances, an LFD can connect to a network via an LFD that acts as a relay (an LFD relay). To illustrate, a gas meter, for example, the LFD 104(N), discovers a battery powered water meter, the LFD 104(3), which is already connected to the AN 106 via the FFD 102(M) and can play the role of an LFD relay. The LFD 104(N) may associate this LFD-relay, the LFD 104(3), as its parent to get connected to the AN 106. In yet further instances, an LFD may connect to other networks and/or connect in other manners.

Example Network Communications Devices

Figure 2:
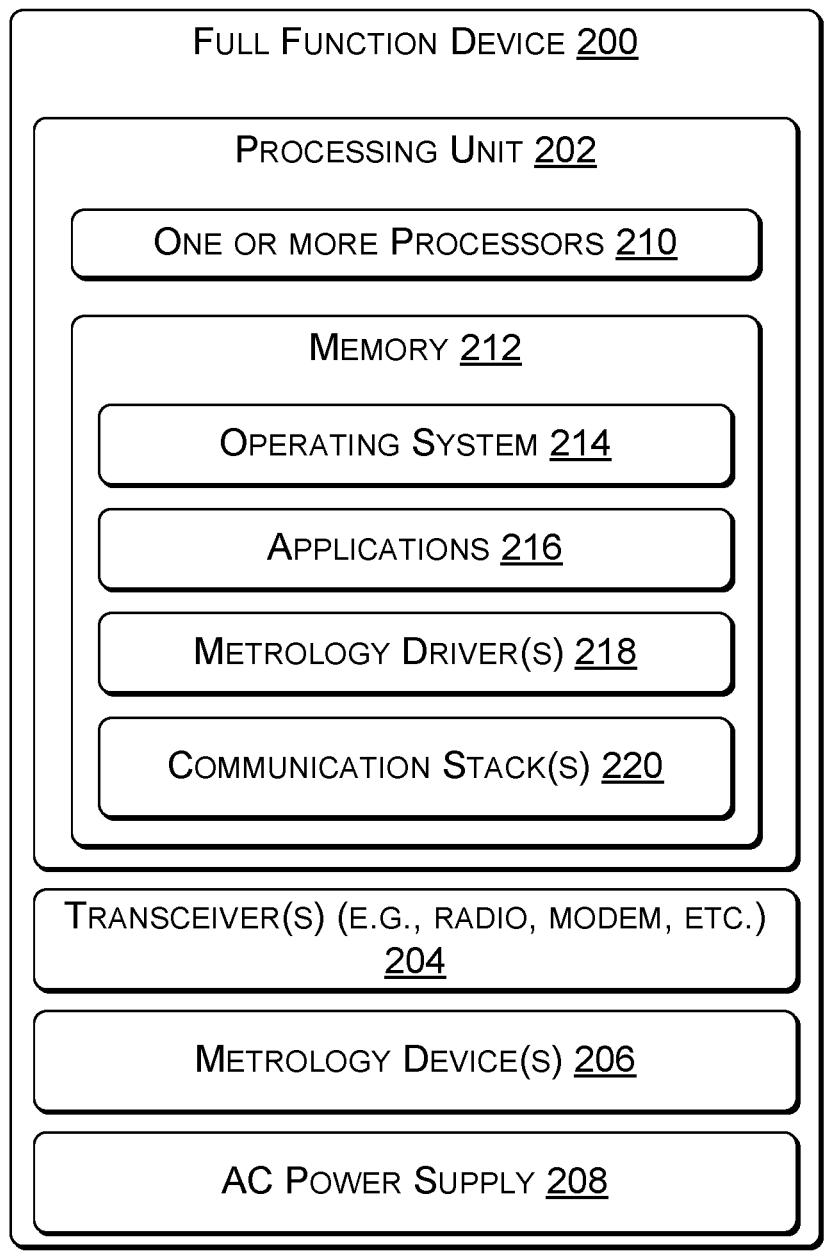
FIG. 2 is a diagram showing details of an example Full Function Device.

FIG. 2 is a diagram showing details of an example Full Function Device 200 (FFD) (sometimes referred to as a Mains Powered Device (MPD)). In this example, FFD 200 comprises a device that is connected to mains power, such as an electricity meter, sensor, etc. However, as discussed above, FFDs can take numerous different forms, depending on the industry and context in which they are deployed. Different types of FFDs may have different physical and/or logical components. For instance, utility meter FFDs such as that shown in FIG. 2A may have metrology components, whereas other types of FFDs may not.

As shown in FIG. 2, the example FFD 200 includes a processing unit 202, a transceiver 204 (e.g., radio), one or more metrology devices 206, and an alternating current (AC) power supply 208 that couples to the AC mains power line wherein the FFD 200 is installed. The processing unit 202 may include one or more processors 210 and memory 212. When present, the one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in the AN 106 and/or other computing devices via the network 110. The transceiver 204 may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to the one or more service providers 112 via the transceiver 204. The consumption data may be formatted and/or packetized in a manner or protocol for transmission.

The memory 212 includes an operating system (OS) 214 and one or more applications 216 that are executable by the one or more processors 210. The memory 212 may also include one or more metrology drivers 218 configured to receive, interpret, and/or otherwise process the metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the device is intended to be compatible. The communication stack(s) 220 describe the functionality and rules governing how the FFD 200 interacts with each of the specified types of networks. For instance, the communication stack(s) 220 may cause FFDs and LFDs to operate in ways that minimize the battery consumption of LFDs when they are connected to these types of networks.

In some instances, the FFD 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

Figure 3:
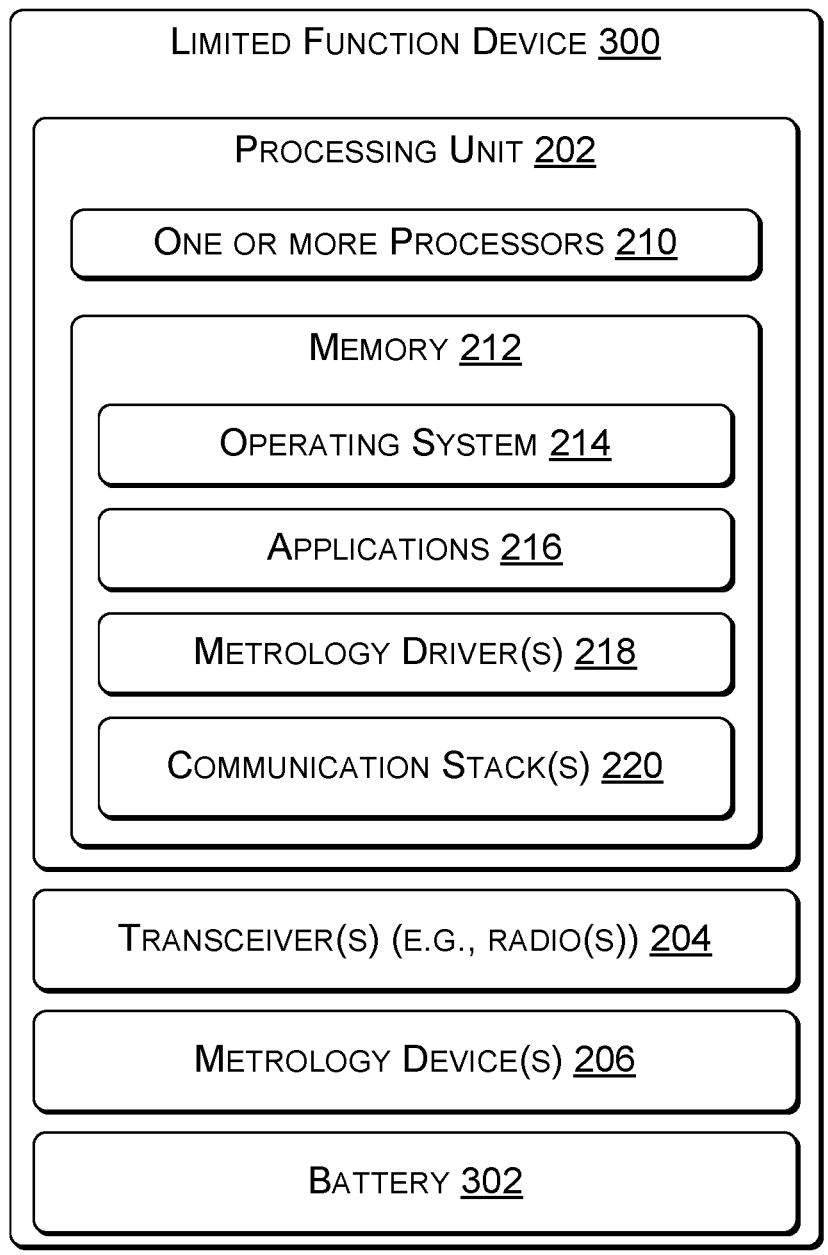
FIG. 3 is a diagram showing details of an example Limited Function Device.

FIG. 3 is a diagram showing details of an example Limited Function Device 300 (sometimes referred to as a Battery Powered Device (BPD). In this example, LFD 300 comprises a device that is not connected to mains power. However, as discussed above, LFDs can take numerous different forms, depending on the industry and context in which they are deployed. Different types of LFDs may have different physical and/or logical components. For instance, utility meter LFDs such as that shown in FIG. 3 may have metrology components, whereas other types of LFDs may not.

The LFD 300 of FIG. 2 is similar in many respects to the FFD 200. To the extent that the FFD 200 and LFD 300 include the same or similar components, the functions will not be repeated here. Therefore, the following discussion of the LFD 300 focuses on the differences between the LFD 300 and the FFD 200. However, the differences highlighted below should not be considered to be exhaustive. One difference between the FFD 200 and the LFD 300 is that the LFD 300 may include a battery 302 instead of the AC power supply 208. The specific characteristics of the battery 302 may vary widely depending on the type of LFD. By way of example and not limitation, the battery 302 may comprise a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

Also, in some examples, even components with similar functions may be different for FFDs than for LFDs due to the different constraints. As one example, while both FFDs and LFDs have transceivers, the specific transceivers used may be different. For instance, an FFD transceiver may include a PLC modem while an LFD transceiver does not because the LFD is not connected to an electrical power line that could be used for PLC communications. Additionally, or alternatively, an LFD transceiver may employ a lower power RF radio to minimize energy consumption. Further, other components of FFDs and LFDs may vary. In some instances, LFDs are implemented with less functionality and/or include less hardware components than the FFDs. Further, in some instances components of LFDs are lower power components than the corresponding components of the FFDs.

The memory 212 of the FFD 200 and LFD 300 is shown to include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the FFD 200 and the LFD 300) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing. Further, in some examples a computing device may be implemented as that described in U.S. application Ser. No. 14/796,762, filed Jun. 10, 2015 and titled "Network Discovery by Battery Powered Devices," the entire contents of which are incorporated herein by reference.

By way of example and not limitation, the FFD 200 and/or the LFD 300 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

In many instances, information that is included in an information element may be stored in the memory 212 of the FFD 200 and/or the LFD 300. For example, the memory 212 may store any information regarding an operating context, such as schedule data, channel data, seed data, timing data, and so on. In some instances, components of the FFD 200 and/or the LFD 300 may reference the information to determine how to communicate according to a specific operating context.

Example Channel Function

Figure 4:
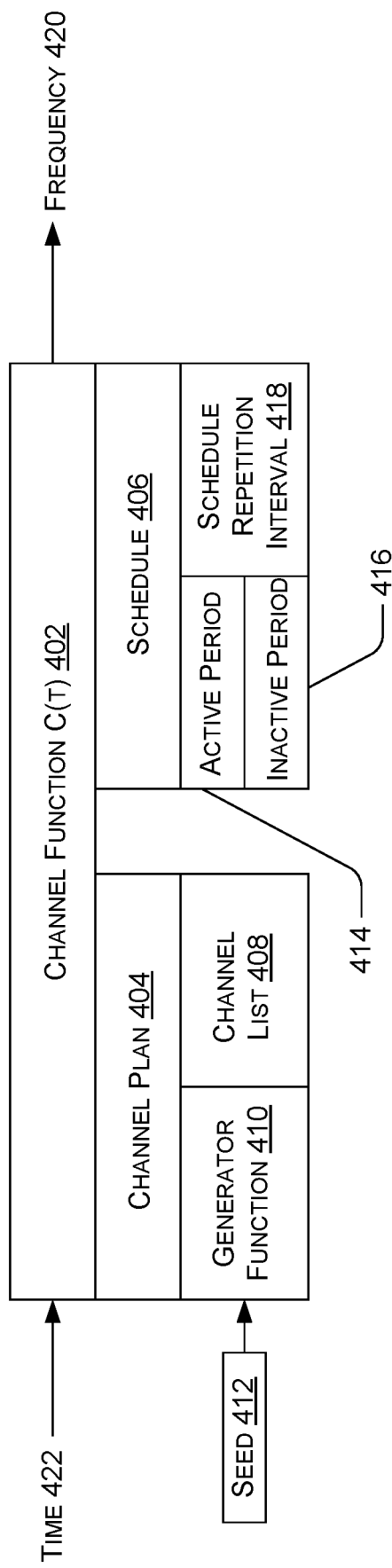
FIG. 4 illustrates an example channel function that may be implemented by a device.

FIG. 4 illustrates an example channel function 402 that may be implemented by a device, such as the FFD 200 and/or the LFD 300. In many instances, the device may communicate in a frequency hopping context (e.g., dynamic, pseudo-random frequency occupancy). To implement frequency hopping, the device may employ the channel function 402 to determine a frequency, at any given time, at which the device will operate.

As illustrated in FIG. 4, the channel function 402 may rely on multiple elements. In particular, the channel function 402 may depend on frequencies determined by a channel plan 404 and time determined by a schedule 406. The channel plan 402 may be generated from available channels in a channel list 408 and a mapping of the available channels to a sequence of elements produced by a generator function 410 (e.g., a Pseudo-Random Generator Function (PRG)). In some instances, the channel list 408 may exclude channels that are identified in a list of excluded channels. Different sequences over the same available channels may be produced depending on a value of a seed 412 that is input into the generator function 410. The schedule 406 may be generated based on an active period 414 and an inactive period 416 for a schedule repetition interval 418. The schedule repetition interval 418 may define a duration of time of a schedule element. The active period 414 may define a duration of time within a schedule element during which a device listens for communications, and the inactive period 416 may define a duration of time within the schedule element during which the device may not listen. The schedule 406 may define the schedule repetition interval 418 which maps onto an element of the channel plan 404 to produce the relationship between time (t) and frequency (f) such that f=C(t). In some instances, the schedule 406 may indicate information related to an event, such as a reference schedule element boundary element number (associated with an event reference schedule element boundary (SEB)), an event offset, and/or an event repetition interval, as discussed in further detail below. An example channel plan is discussed in further detail in reference to FIG. 5, while an example schedule structure and schedules are discussed in reference to FIGS. 6 and 7.

The generator function 410 may implement a variety of functions to produce the channel plan 404 from the channel list 408. For example, the generator function 410 may implement a direct hash (e.g., Jenkins Hash), a randomizing algorithm (e.g., that described in ANSI-TIA-4957.200), or any other type of function.

As such, the channel function 402 may be used by a device to determine a frequency (f) 420 for a time (t) 422. That is, the channel function 420 may receive, as an input, the time 422 and provide, as an output, the frequency 420 for the time 422. This may allow the device to frequency hop over various channels.

Example Channel Plan

Figure 5:
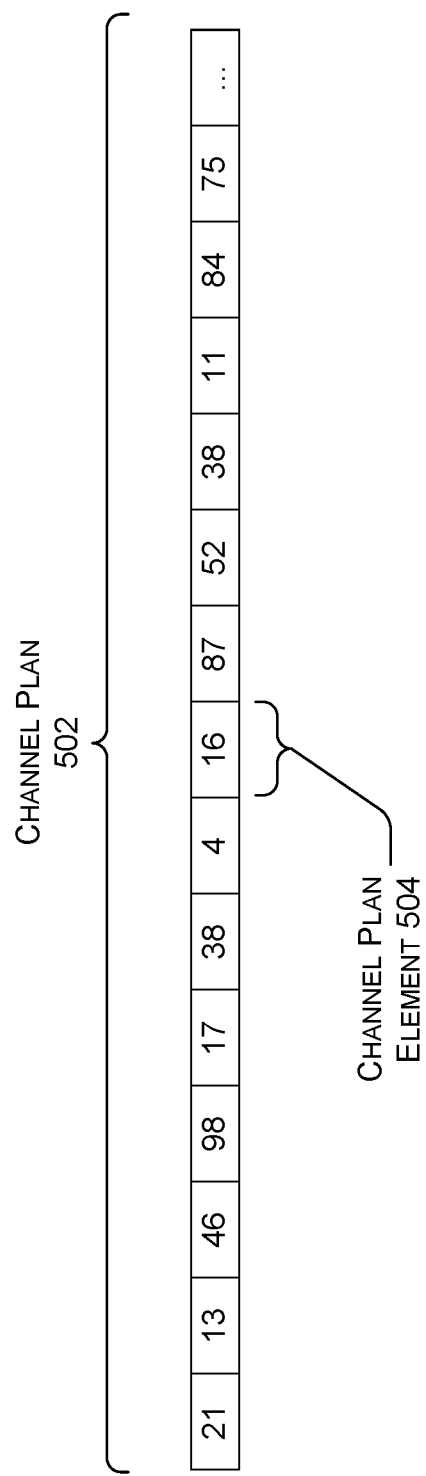
FIG. 5 illustrates an example channel plan.

FIG. 5 illustrates an example channel plan 502. The example channel plan 502 may be used within the context of the channel function 402 of FIG. 4 (e.g., implemented as the channel plan 404).

As illustrated, the channel plan 502 may include a pseudo-random channel number sequence (e.g., 21, 13, 46, ... ). As noted above, a generator function (e.g., the generator function 410 of FIG. 4) may generate the pseudo-random channel number sequence (the channel plan 502) over a range of channel numbers derived from a channel list (e.g., the channel list 408 of FIG. 4). In some instances, the channel list may exclude channels that are identified in a list of excluded channels. In the example of FIG. 5, each number in the pseudo-random channel number sequence represents a channel (e.g., a frequency band). As illustrated, a channel plan element 504 may correspond to a channel (e.g., channel 16 in this example). Here, there are 128 available channels, although any number of channels may be implemented (e.g., 32 channels, 64 channels, etc.). Thus, the pseudo-random channel number sequence may include numbers from 1 to 128.

In some instances, multiple frequency bands are defined for operation in different regions and/or regulatory domains. A total number of channels, and hence the available channel number range, may depend on a selected regional band and channel spacing, which may be determined by a PHY configuration. A channel list may advertise a regional frequency band, channel center frequencies and spacing, and optionally a set of channels to be excluded.

Example Schedule Structure

Figure 6:
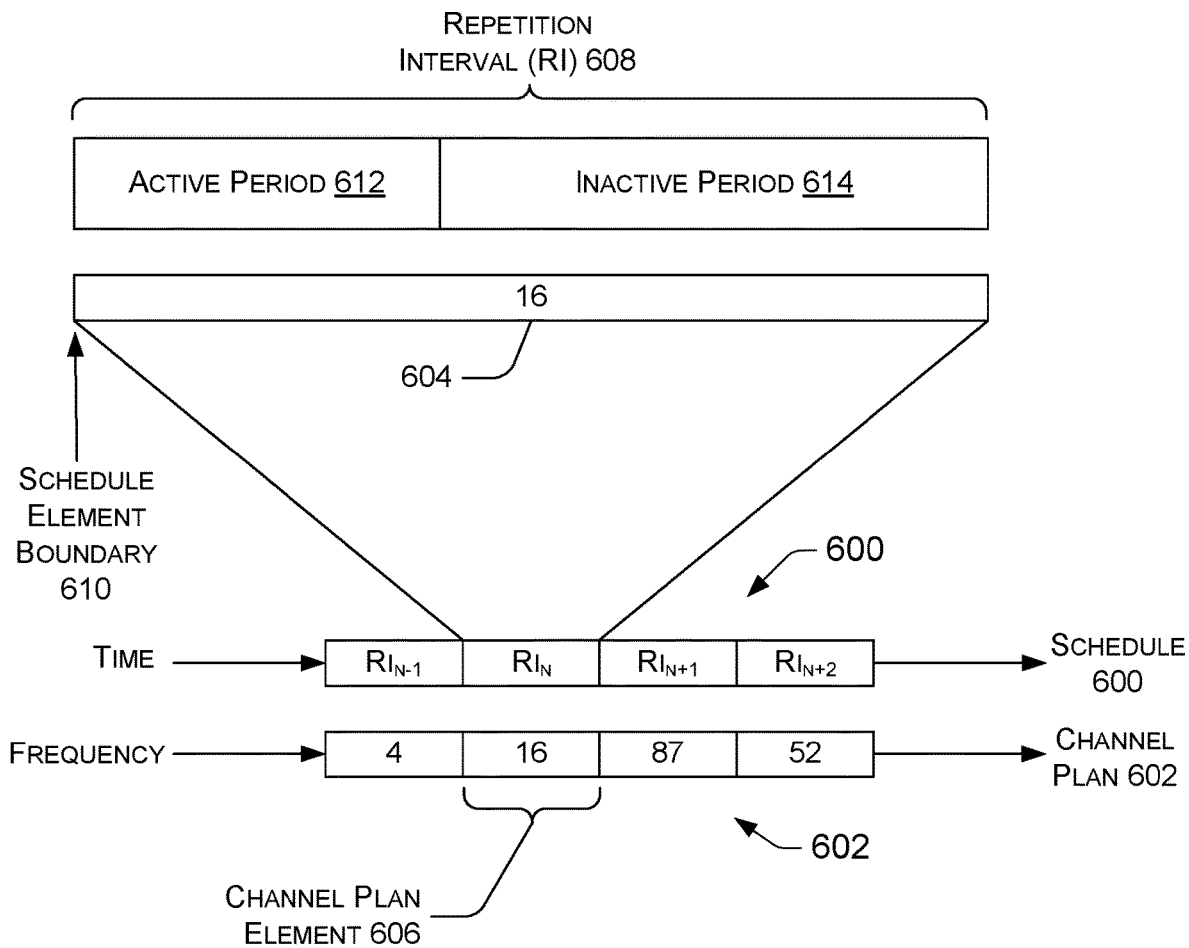
FIG. 6 illustrates an example structure of a schedule.

FIG. 6 illustrates an example structure of a schedule 600. The schedule 600 defines the timing of a sequence of elements superimposed on a channel plan 602. As illustrated, each schedule element in the schedule 600 corresponds to a channel plan element in a channel plan 602. For example, a schedule element 604 corresponds to a channel plan element 606. The schedule 600 describes behavior in the time domain, whereas the channel plan 602 describes behavior in the frequency domain.

In the example of FIG. 6, an interval between a start of two successive schedule elements may comprise a Repetition Interval (RI) 608. In other words, an RI (also referred to as a "schedule repetition interval") comprises a duration of time of a schedule element. Each RI begins at a Schedule Element Boundary (SEB) 610. The next SEB occurs on the channel number corresponding to the next element in the schedule. The origin of the schedule 600 (the SEB of element 0) occurs at a reference time from which the element index corresponding to any given time t can be computed as $Floor((t-SEB_0)/RI)$. As illustrated, an RI may be composed of an active period 612 and an inactive period 614. As such, in some instances, RI=Active Period+Inactive Period. In some instances, the active period 612 or the inactive period 614 may have a duration of 0 seconds.

Example Schedules

Figure 7:
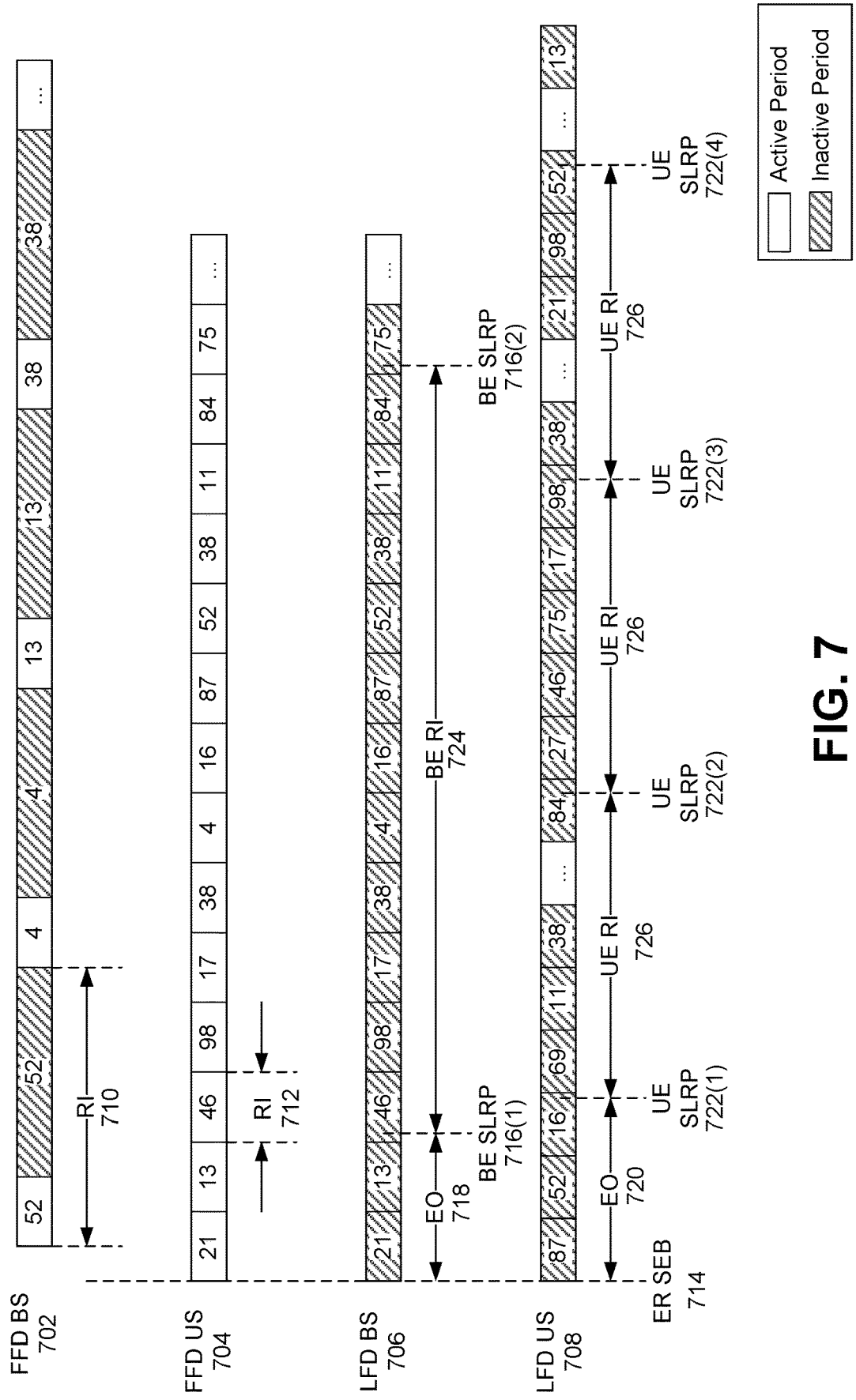
FIG. 7 illustrates example schedules.

FIG. 7 illustrates example schedules 702, 704, 706, and 708. Each of the schedules 702-708 may be associated with a different operating context. For example, the schedule 702 is associated with an FFD broadcast operating context (e.g., an FFD Broadcast Schedule (BS)), the schedule 704 is associated with an FFD unicast operating context (e.g., an FFD Unicast Schedule (US)), the schedule 706 is associated with an LFD broadcast operating context (e.g., an LFD Broadcast Schedule (BS)), and the schedule 708 is associated with an LFD unicast schedule (e.g., an LFD Unicast Schedule (US)). As such, each of the schedules 702-708 comprises a different schedule type. In some instances, other types of operating contexts may additionally be implemented, such as a broadcast schedule operating context associated with group acknowledgment.

An operating context may generally define a set of parameters or information for a communication service, such as broadcast, unicast, multicast, etc. For example, an operating context may define a channel plan, a generator function, a channel list, a schedule, an active or inactive period, a schedule repetition interval, a reference schedule element boundary element number, an event offset, an event repetition interval, a seed value, and so on. In many instances, an operating context may be associated with information included in a channel information element, a schedule information element, a timing and type information element, a seed information element, a group acknowledgment information element, and/or any other information element. In some instances, an operating context may be specific to a device. For example, an FFD may include its own broadcast operating context, while an LFD may include its own broadcast operating context. As discussed in further detail below, in some instances a parameter or information for one operating context may be used in another operating context. In some instances, a device may implement multiple operating contexts for the same type of communication service (e.g., multiple broadcast operating contexts).

In one illustration, an operating context may include a generator function, a seed, a channel list, a schedule, an active/inactive period, a repetition interval, and/or event information (e.g., event offset, event repetition interval, etc.). Here, for any given regional frequency band, a different channel plan may be required for each PHY operating mode with a different channel list owing to a different channel spacing or different excluded channel list. The generator function (e.g., PRG) can produce different channel plans from the same channel list depending on the value of the seed. If, for instance, a same generator function and a same seed value are used, the same channel plan may be determined. The timing defined by the schedule may determine the specific frequency occupied at any given time for a specific channel plan. In this illustration, the schedule may be declared in a schedule information element, the generator function and the channel list may be declared in a channel information element, and the seed may either be known a priori or declared in a seed information element. Timing may be defined in a timing and type information element referenced to the Frame Reference Time (FRT) (e.g., referenced to some agreed nominal point of the Frame Structure, such as the end of the SHR or the start of the PHR). If no seed information element is included when an operating context is defined, a MAC address of a device may be used (e.g., an FFD EUI-64).

As noted above, a schedule may include a Repetition Interval (RI) for a schedule element. For example, each element in the FFD BS 702 is associated with an RI 710, while each element in the FFD US 704 is associated with an RI 712. In some instances, an element of a schedule may be associated with an active period and/or an inactive period. As illustrated, each element in the FFD BS 702 may be associated with an active period (illustrated without slanted lines) and an inactive period (illustrated with slanted lines). During the active period, the FFD may listen for broadcast communications from other devices. During the inactive period, the FFD may not listen for broadcast communications and/or may perform other functionality, such as transmitting communications. Further, each element in the FFD US 704 may comprise an active period. Here, the FFD may listen for unicast communications from other devices during the entire element (e.g., the entire RI 712). Moreover, each element in the LFD BS 706 and LFD US 708 may comprise an inactive period. Here, the LFD may not listen for communications, except at specific instances (e.g., event SLRPs), as discussed below. In the example of FIG. 7, the LFD BS 706 and LFD US 708 include the same RI as the FFD US 704. Although in other examples, the RIs may be different. An RI may be advertised in a schedule information element.

In many instances, a schedule may be aligned to a specific reference point. In the example of FIG. 7, the FFD US 704, the LFD BS 706, and the LFD US 708 are aligned to an Event Reference Schedule Element Boundary (ER SEB) 714. The ER SEB 714 may be at a start of a particular schedule element selected to serve as an event reference. For example, a parent FFD may cause children LFDs to be aligned to a schedule that is associated with the parent FFD. The parent FFD may advertise a reference schedule element boundary element number to children LFD devices. The reference schedule element boundary element number may comprise a schedule element number for a particular schedule element selected to serve as an event reference. A start of the particular schedule element may comprise the ER SEB. As such, the schedule of the children LFDs may be aligned to the schedule of the parent FFD. In the example of FIG. 7, the LFD BS 706 and the LFD US 708 are aligned to the FFD US 704. In many instances, schedules of children LFDs are aligned to the parent FFD unicast schedule.

As illustrated in FIG. 7, the FFD BS 702 may not be aligned to the ER SEB 714. In some instances, a device may maintain the FFD BS 702 where the timing of this schedule drifts with respect to the timing of the FFD US 704, the LFD BS 706, and the LFD US 708. For example, the FFD BS 702 may be maintained using a time derived from a clock local to the device, while the FFD US 704, the LFD BS 706, and/or the LFD US 708 may be maintained using time derived from a clock of another device. Drift between the two clocks may cause the schedule time references (e.g. SEBs) to drift relative each other.

In some instances, a schedule may also include information related to an event. An event may define a time when a transmission is scheduled to occur. An event may generally occur at an event Sampled Listening Reference Point (SLRP) (e.g., a time). By defining a time for an event SLRP, a device may enable or disable a receiver to receive a transmission. Further, the device may enter or awake from a low power state. As such, the device may operate in a sampled listening manner.

In the example of FIG. 7, the LFD BS 706 includes Broadcast Event (BE) SLRPs 716 that indicate when the LFD should listen for communications (e.g., for communications from a parent FFD). The first BE SLRP 716(1) may be defined by an Event Offset (EO) 718. As illustrated, the EO 718 may comprise a duration of time from the ER SEB 714 to the first BE SLRP 716(1). The duration of time may cause the first BE SLRP 716(1) to be located anywhere within a schedule element (e.g., the BE SLRP 716(1) does not need to be located at the start of a schedule element). Similarly, the LFD US 708 may include an EO 720 from the ER SEB 714 to the first Unicast Event (UE) SLRP 722(1). As illustrated, the EO 720 may be different than the EO 718. In instances where a parent FFD manages multiple children LFDs, this may allow the parent FFD to schedule transmissions at different times for broadcast and unicast. Although in other instances the EO 720 may be the same as the EO 718.

After a first event SLRP is defined in a schedule, any further event SLRPs in the schedule may be defined according to an event repetition interval. For example, in the LFD BS 706, the BE SLRPs 716 are separated from each other by a BE RI 724. The BE RI 724 may comprise a duration of time between successive BE SLRPs 716. As also illustrated in the LFD US 708, the UE SLRPs 722 are separated from each other by a UE RI 726. In this example, the UE SLRPs 722 repeat more frequently than the BE SLRPs 716. Although the UE SLRPs 722 may repeat less frequently, or according to the same repeat interval. Further, although a particular number of event SLRPs are illustrated in FIG. 7 for the LFD BS 706 and/or the LFD US 708, any number of event SLRPs may be included. Further, the LFD BS 706 and/or the LFD US 708 may continue for any length time (e.g., event SLRPs may repeat according to an event RI for any length of time).

In some instances, a BE SLRPs may be the same for a number of devices. For example, if an FFD acts as a parent for multiple children LFDs, the FFD parent may set a same EO from the ER SEB for the multiple children LFDs. Further, the FFD parent may set the same BE RI for the multiple children LFDs. This may allow the FFD parent to establish the same BE SLRPs, and thus, send a broadcast communication to the multiple LFD children at the same time.

Further, in some instances a UE SLRPs may be different for a number of devices. In returning to the example where an FFD acts as a parent to multiple LFDs, the FFD parent may set a different EO from the ER SEB for each of the multiple children LFDs. Further, the FFD parent may set a same UE RI (or a different UE RI) for each of the multiple children. This may allow the parent FFD to schedule different UE SLRPs (e.g., unicast transmission at different times) for the different children LFDs.

In the example of FIG. 7, the FFD US 704 and LFD BS 706 are shown with identical channel plans (and schedule elements). In some instances, regulations, such as the Federal Communications Commission (FCC) may require such. However, in other examples the FFD US 704 and LFD BS 706 may vary in structure.

In some instances, the schedules 702-708 are described as being different types due to an association with an active period and/or inactive period. For example, a first type of schedule may be described as an active period non-zero, zero inactive period schedule (RI=active period). The FFD US 704 is such a schedule. Here, an FFD listens by default on the channel corresponding to each element of its US. A second type of schedule may be described as an active period non-zero, inactive period non-zero schedule (RI=active period+inactive period). The FFD BS 702 is such a schedule. Here, periodically (each RI), an FFD listens on the channel corresponding to the BS element during the active period and does not listen during the inactive period. A third type of schedule may be described as a zero active period, non-zero inactive period schedule (RI=inactive period). The LFD BS 706 and LFD US 708 (e.g., all LFD schedules) are such in the examples of FIG. 7. Here, an LFD does not listen on any channel except at specifically defined SLRPs corresponding to events.

Although the schedules 702-708 are illustrated with various items (e.g., RIs, offsets, event RIs, event SLRPs, etc.), these schedules 702-708 are merely illustrative. That is, the schedules 702-708 illustrate a few example schedules for the purpose of discussion. Many other types of schedules may be used (e.g., RIs, offsets, event RIs, event SLRPs, etc. may be set to different values), which may depend on the context in which the techniques are implement.

Example Sampled Listening Period

Figure 8:
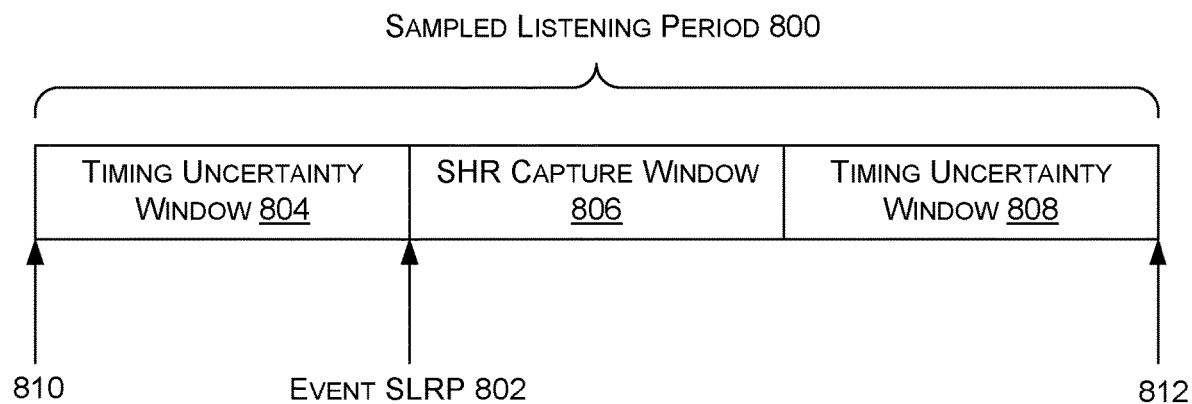
FIG. 8 illustrates an example sampled listening period associated with an event sampled listening reference point (SLRP).

FIG. 8 illustrates an example sampled listening period 800 associated with an event sampled listening reference point (SLRP) 802. The event SLRP 802 may correspond to any type of event SLRP, such as the BE SLRP 716, EU SLRP 722, and so on.

The sampled listening period 800 may represent a duration of time during which a device listens for a communication defined by an event SLRP. As noted above, an event SLRP represents a reference point for a sampled listening event. For example, an event SLRP indicates when a transmission is scheduled to occur. In some instances, by knowing when the event SLRP is, a device may enter a low power state and/or awake from the low power state. Since devices may experience clock drift, and timing inaccuracy, the devices may not be completely synchronized. Thus, the sampled listening period 800 may allow a device to account for timing uncertainty (e.g., receive a communication even when the device's clock has drifted with respect to the clock on the other device involved in the communication).

In particular, the sampled listening period 800 includes a timing uncertainty window 804 located before a Synchronization Header (SHR) capture window 806 and a timing uncertainty window 808 located after the SHR capture window 806. In many instances, the timing uncertainty window 804 and the timing uncertainty window 808 may each include the same duration of time.

As noted above, a device may listen for a communication according to the sampled listening period 800. In particular, the device may enable a receiver to listen (awake from a low power state, in some instances) for a communication at a start 810 of the timing uncertainty window 804. Thereafter, the device may receive the communication during the SHR capture window 806, and disable the receiver from listening (enter the low power state, in some instances) at an end 812 of the timing uncertainty window 808. Thus, the device may listen for the communication for the duration of the sampled listening period 800.

Example Processes

FIGS. 9-18 illustrate example processes 900, 1000, 1100, 1200, 1300, 1400, 1500, 1600, 1700, and 1800 for employing the techniques discussed herein. For ease of illustration the processes 900, 1000, 1100, 1200, 1300, 1400, 1500, 1600, 1700, and 1800 may be described as being performed by a device described herein, such as the FFD 200 and/or the LFD 300. However, the processes 900, 1000, 1100, 1200, 1300, 1400, 1500, 1600, 1700, and 1800 may be performed by other devices. Moreover, the devices may be used to perform other processes.

The processes 900, 1000, 1100, 1200, 1300, 1400, 1500, 1600, 1700, and 1800 (as well as each process described herein) are illustrated a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Figure 9:
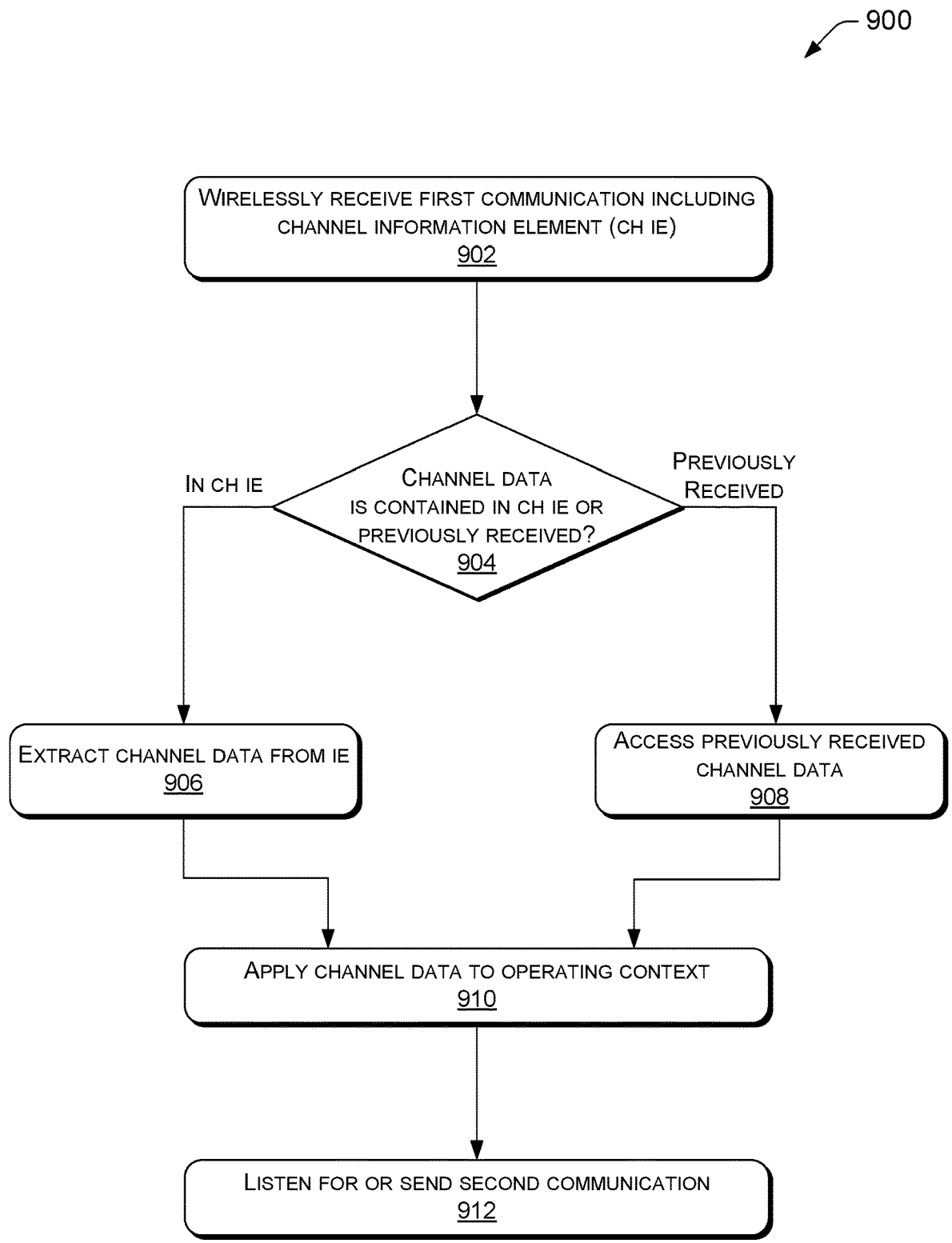
FIG. 9 illustrates an example process to apply channel data to an operating context.

FIG. 9 illustrates the example process 900 to apply channel data to an operating context.

At 902, a first device (e.g., the FFD 200 or the LFD 300) may wirelessly receive a first communication from a second device (e.g., the FFD 200 or the LFD 300). The first communication may include a channel information element and/or another information element. The channel information element may include and/or indicate a tag indicating a first operating context to which to apply channel data; a reference tag including one or more reference bits to (i) indicate whether the channel data is contained in the channel information element or has been previously received and/or (ii) identify a second operating context associated with previously received channel data to be used as the channel data; a future transition element number (e.g., a channel/schedule element number) that indicates when to apply the channel data to the first operating context; and/or the channel data. The channel data may include and/or indicate at least one of a channel plan, a generator function (e.g., Pseudo-Random Generator function (PRG)), a list of channels, and/or a list of excluded channels.

In some instances, the operation 902 is performed without receiving schedule data (e.g., a schedule active period, schedule repetition interval, and so on), seed data, etc. Here, the first communication may merely include or reference channel data to apply to the first context. Although in other instances, such information may be included in the first communication.

At 904, the first device may determine whether the channel data is contained in the channel information element or previously received. This may include analyzing the reference tag of the channel information, which may indicate whether the channel data is contained in the channel information element or has been previously received. If the channel data is included in the channel information element, the process 900 may proceed to 906 to extract the channel data from the channel information element. If the channel data has been previously received, the process may proceed to 908 to access the previously received channel data. Here, the channel data may have been previously stored in memory of the first device (e.g., the memory 212 of the FFD 200 or the memory 212 of the LFD 300), and the first device may access that channel data.

Although the process 900 illustrates performing either the operation 906 or 908, in some instances both operations may be performed. For example, some channel data may be extracted from the channel information and some channel data may be accessed from previously received channel data.

In any event, whether channel data is extracted from the channel information element and/or accessed from previously stored data, the first device may, at 910, apply the channel data to the first operating context. In some instances, the first operating context may have already been established (e.g., set) on the first device (e.g., channel data may have been previously received for the first operating context). Here, the operation 910 may include updating (e.g., replacing) the existing channel data with the channel data extracted from the channel information element or obtained from the second operating context. As such, the existing channel data may be updated with the new channel data. In other instances, the first operating context may not have been established on the first device, and the operation 910 may include establishing the first operating context for the first device by associating the channel data with the first operating context.

If, for example, the future transition element number is specified in the channel information element, the operation 910 may be performed to the first operating context at the channel plan or schedule element that is associated with the future transition element number. To illustrate, the channel data may be applied to a channel plan element that is twenty elements in the future.

At 912, the first device may listen for a second communication and/or send the second communication based on the first operating context (e.g., the operating context that has the channel data applied thereto). This may include using the channel plan, the generator function, the channel list, etc. associated with the first operating to listen for or send the second communication. For example, this may include configuring a radio associated with the first device to operate according to the first operating context.

Figure 10:
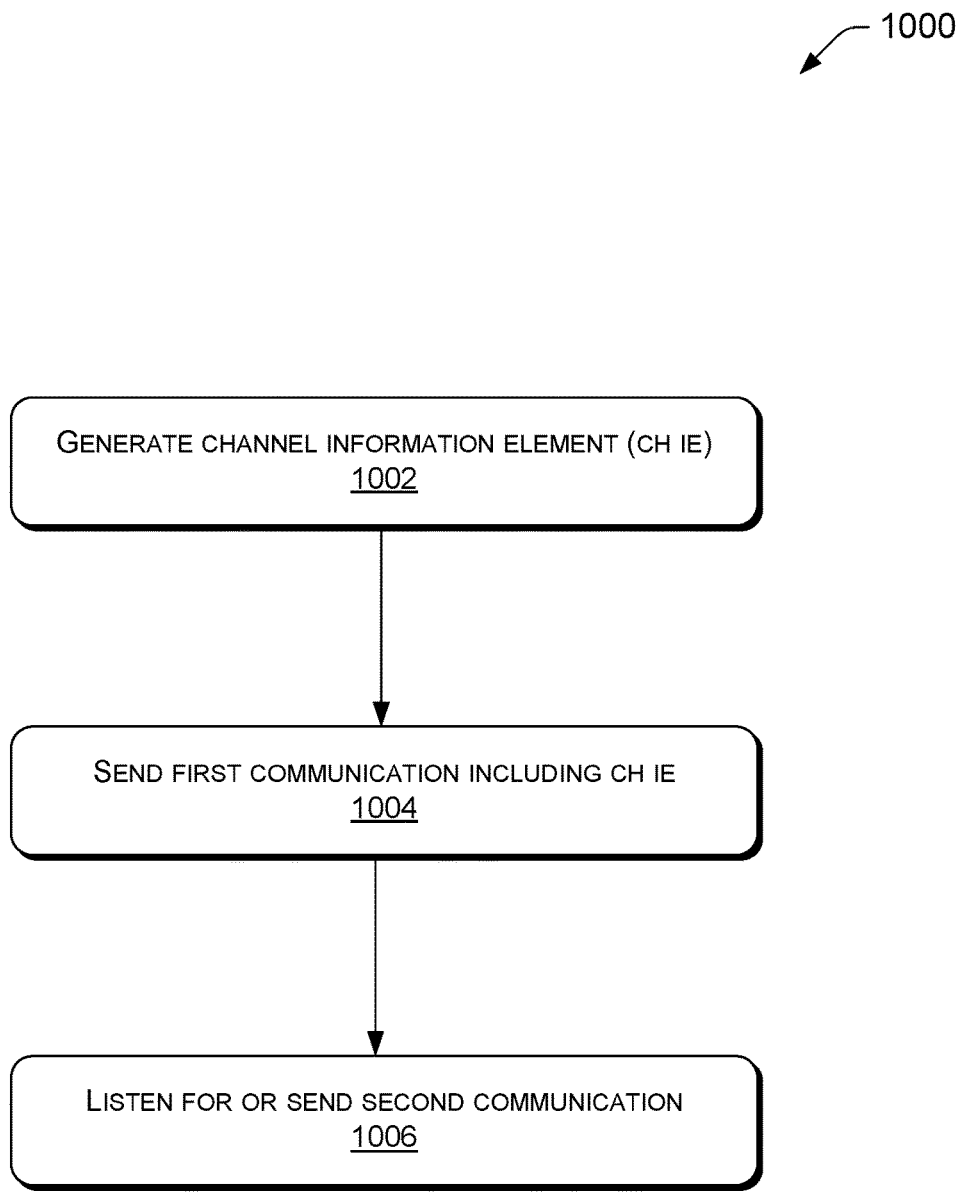
FIG. 10 illustrates an example process to generate and send a communication that includes a channel information element.

FIG. 10 illustrates the example process 1000 to generate and send a communication that includes a channel information element.

At 1002, a first device (e.g., the FFD 200 or the LFD 300) may generate a channel information element regarding channel data for a first operating context. In some instances, the first device may determine the channel data to apply to the first operating context and then determine whether or not a second device has previously received the channel data (e.g., in association with a second operating context). If the second device has received channel data that is determined to be applied to the first operating context, the first device may include a reference tag to signal to the second device to use the previously received channel data for the first operating context. However, if the channel data has not yet been received, the first device may include the channel data in the channel information element.

In some instances, if the first device determines that the channel data is to be applied in the future, the first device may include a future transition element number in the channel information element.

At 1004, the first device may send a first communication to the second device. The first communication may include the channel information element and/or other information elements.

At 1006, the first device may listen for a second communication and/or send the second communication based on the first operating context and the channel data referenced or included in the channel information element. This may include configuring a radio of the first device to operate according to the first operating context with the channel data having been applied thereto.

Figure 11A:
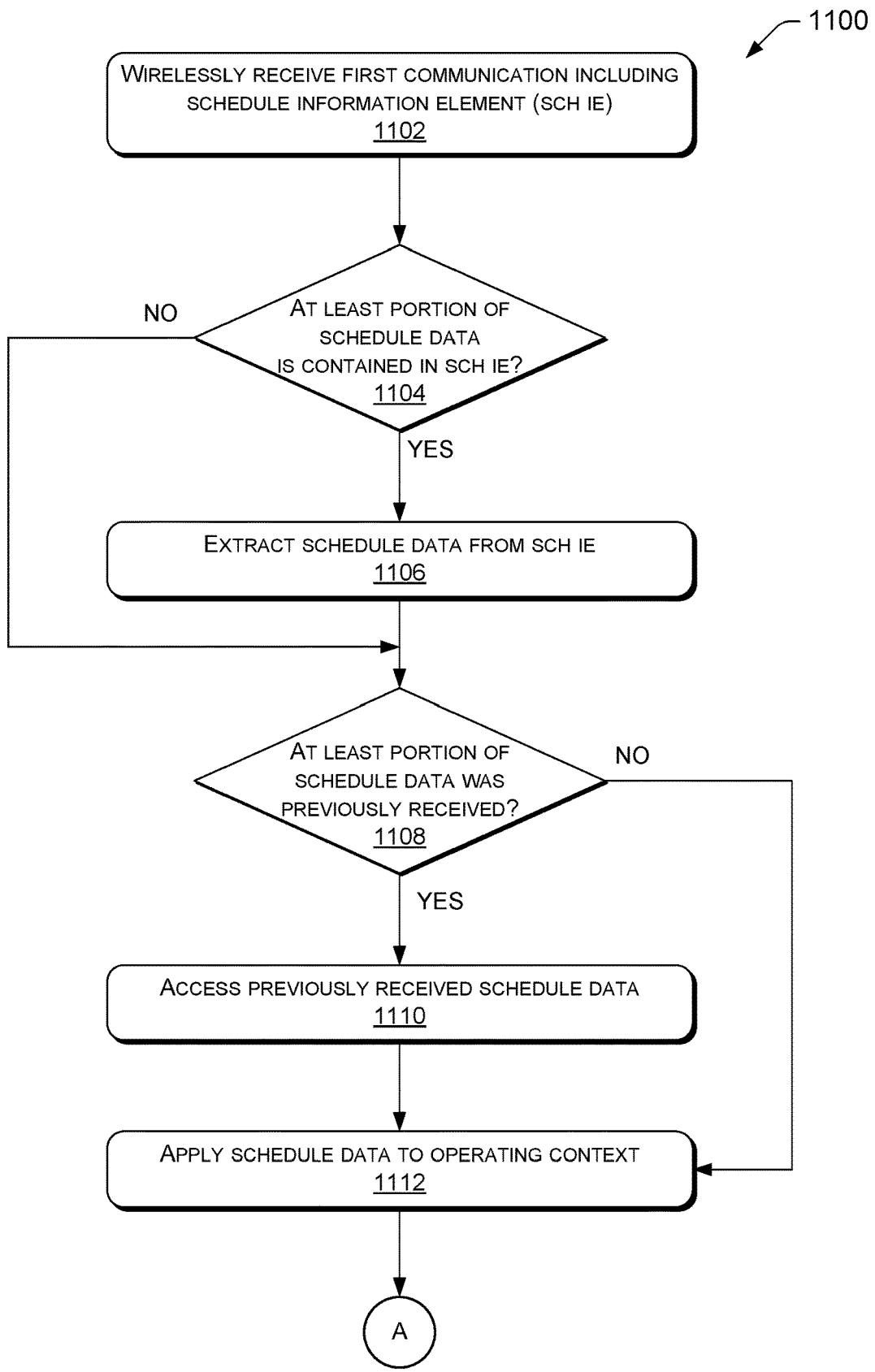
FIGS. 11A and 11B illustrate an example process to apply schedule data to an operating context.
Figure 11B:
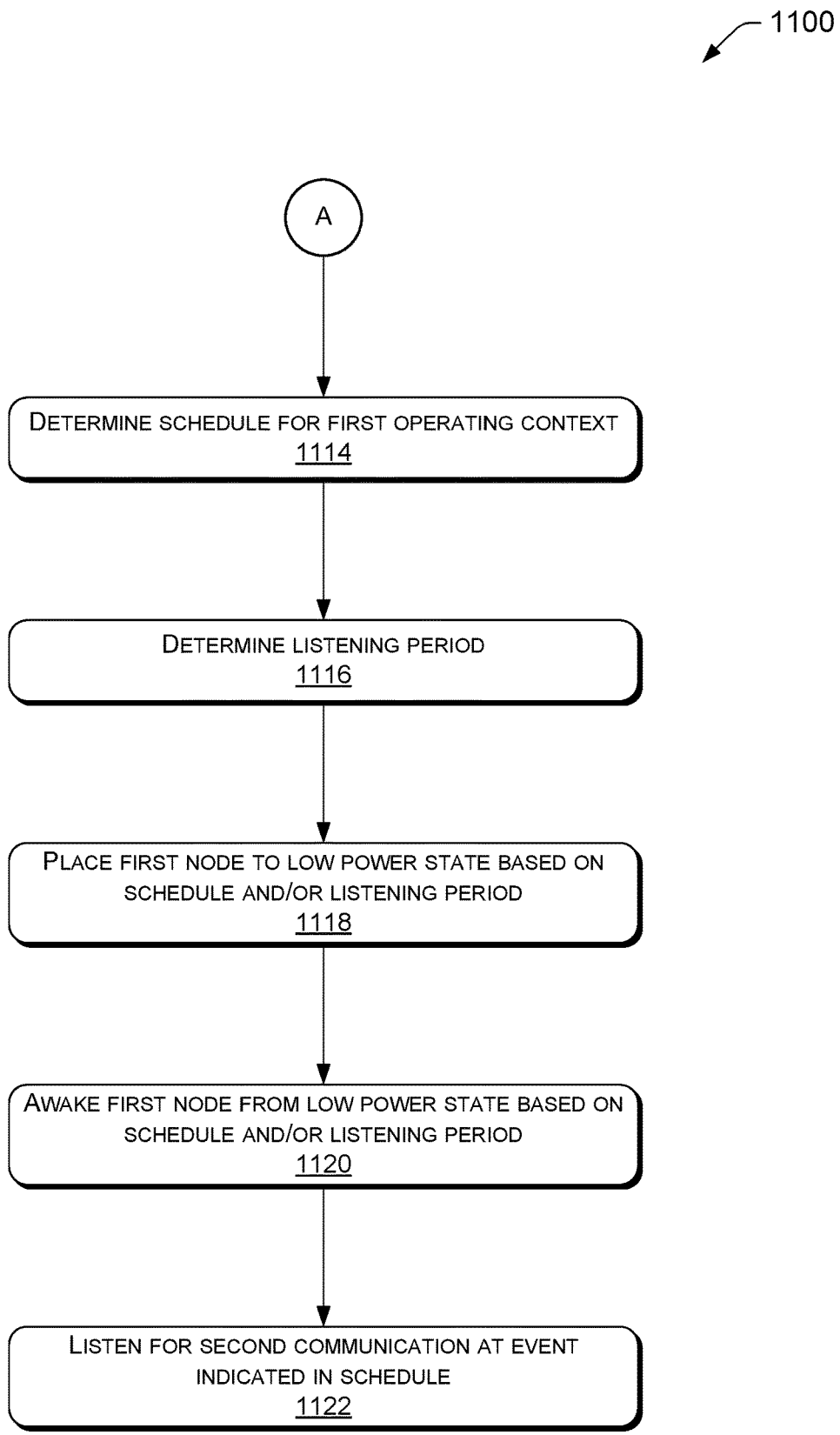

FIGS. 11A and 11B illustrate the example process 1100 to apply schedule data to an operating context.

In FIG. 11A, at 1102, a first device (e.g., the FFD 200 or the LFD 300) may wirelessly receive a first communication from a second device (e.g., the FFD 200 or the LFD 300). The first communication may include a schedule information element. The schedule information element may include and/or indicate a tag indicating a first operating context to which to apply schedule data; a reference tag including one or more reference bits to (i) indicate whether at least a portion of the schedule data is contained in the schedule information element or has been previously received and/or (ii) identify a second operating context associated with a previously received schedule data to be used as at least the portion of the schedule data; a future transition element number that indicates when to apply the schedule data to the first operating context; and/or the schedule data.

The schedule data may include and/or indicate a schedule active period comprising a duration of time of an active period within a schedule element during which the first node listens for communications; a schedule repetition interval comprising a duration of time of the schedule element; an event reference comprising a reference schedule element boundary element number for a particular schedule element, a start of the particular schedule element comprising an event reference schedule element boundary (SEB); an event offset comprising a duration of time from the event reference SEB to an event sampled listening reference point (SLRP);

and/or an event repetition interval comprising a duration of time between successive event SLRPs.

In some instances, the reference tag is used to reference a particular type of schedule data. For example, the reference tag may be used to reference a previously established schedule active period or a previously established schedule repetition interval. As such, a portion of the schedule data may include the previously established schedule active period or a previously established schedule repetition interval, in some instances. Although in other instances, the reference tag may reference any type of schedule data.

In some instances, the operation 1102 is performed without receiving data indicating a channel plan, a generator function, a list of available channels, a list of excluded channels, or other channel data. In other words, the first communication may not include such data (e.g., may not include channel data). Here, the first communication may merely include or reference schedule data to apply to the first context. Although in other instances, such information may be included (e.g., in a channel information element).

At 1104, the first device may determine whether or not at least a portion of the schedule data is contained in the schedule information element. For example, the first device may analyze the reference tag, which may indicate whether or not at least the portion of the schedule data is contained in the schedule information element. If at least the portion of the schedule data is contained in the schedule information element (e.g., the YES path), the process 1100 may proceed to 1106 and extract at least the portion of the schedule data from the schedule information element. If at least the portion of the schedule data is not contained in the schedule information element (e.g., the NO path), the process 1100 may skip the operation 1106.

At 1108, the first device may determine whether or not at least a portion of the schedule data was previously received. In other words, the first device may determine whether or not at least the portion of the schedule data is associated with an existing operating context established on the first device (e.g., the second operating context). If at least a portion of the schedule data was previously received (e.g., the YES path), the process 1100 may proceed to 1110 and access at least the portion of the previously received schedule data. Here, the previously received schedule data may have been previously stored in memory of the first device (e.g., the memory 212 of the FFD 200 or the memory 212 of the LFD 300), and the first device may access that schedule data from the memory. If at least the portion of the schedule data was not previously received (e.g., the NO path), the process 1100 may skip the operation 1110.

In any event, at 1112, the first device may apply the schedule data that is extracted and/or accessed from previously received schedule data to the first operating context. In some instances, the first operating context may have already been established (e.g., set) on the first device (e.g., schedule data may have been previously received for the first operating context). Here, the operation 1112 may include updating (e.g., replacing) the existing schedule data with the schedule data extracted from the schedule information element and/or obtained from the second operating context (e.g., the memory of the first device). As such, the existing schedule data may be updating with the new schedule data. In other instances, the first operating context may not have been established on the first device, and the operation 1112 may include establishing the first operating context for the first device by associating the schedule data with the first operating context.

If, for example, the future transition element number is specified in the schedule information element, the operation 1112 may be performed to the first operating context at the channel plan or schedule element that is associated with the future transition element number. For example, the schedule data may be applied to a channel plan element that is twenty elements in the future.

In FIG. 11B, at 1114, the first device may determine a schedule for the first operating context. That is, the schedule may be based on the first operating context with the schedule data applied. The schedule may indicate various information, as discussed herein. For example, the schedule may indicate an event reference schedule element boundary, an event offset to a first event Sampled Listening Reference Point (SLRP), an event repetition interval, and so on. As such, the schedule may generally indicate when a communication is expected to be transmitted from another device. In many instances, this may allow the first device to determine when it needs to be awake and where to listen for a communication (e.g., on what channel).

At 1116, the first device may determine a listening period (e.g., sampled listening period). This may include determining a particular amount of time before an event SLRP and/or a particular amount of time after the event SLRP. The listening period may be determined based on a last communication that was received from the second device (e.g., a parent device to which the first device is synchronized), where the last communication includes timing synchronization information (e.g., information in a timing and type information element); an amount of time that has lapsed since receiving the last communication from the second device; an amount of timing uncertainty associated with the first device, where the timing uncertainty is based on a timing accuracy for the first device (e.g., jitter) or clock drift for the first device (e.g., how accurate is the clock of the first device); and/or an amount of timing uncertainty associated with the second device, where the timing uncertainty is based on a timing accuracy for the second node (e.g., jitter) or clock drift for the second node (e.g., how accurate is the clock of the second device). In some instances, timing synchronization information is included in each communication that is sent. In one illustration, the listening period may increase (or decrease) as the amount of time from receiving a last communication that includes timing synchronization information increases (or decreases). In another illustration, the listening period may increase (or decrease) as the amount of timing uncertainty of the first device or the second device increases (or decreases). In yet other illustrations, any combination of such techniques may be implemented to increase or decrease the listening period.

At 1118, the first device may place the first device in a low power state based on the schedule and/or the listening period. The low power state may comprise a sleep state, an off state, or any other state that is associated with less than a threshold amount of power (e.g., the first device is consuming less than the threshold amount of power). When the first device is fully powered on and/or not asleep, the first device may be associated with more than the threshold amount of power (e.g., the first device is consuming more than the threshold amount of power).

At 1120, the first device may awake from the low power state based on the schedule and/or the listening period. For example, the first device may awake from the low power state at the start of the listening period associated with an event SLRP.

At 1122, the first device may listen for a second communication during the listening window.

The operations 1118, 1120, and/or 1122 may generally be implemented to maintain the first device in the low power state for as long as possible. This may conserve battery life, processing resources, etc. For example, the first device may be placed in the low power state for any period of time where a transmission event is not scheduled to occur. To illustrate, during an event repetition interval (between event SLRPs) the first device may remain in a low power state. The first device may awake just before an event SLRP (at the start of the listening period) to listen for a communication. After the listening period has expired, the first device may return to the low power state.

Figure 12:
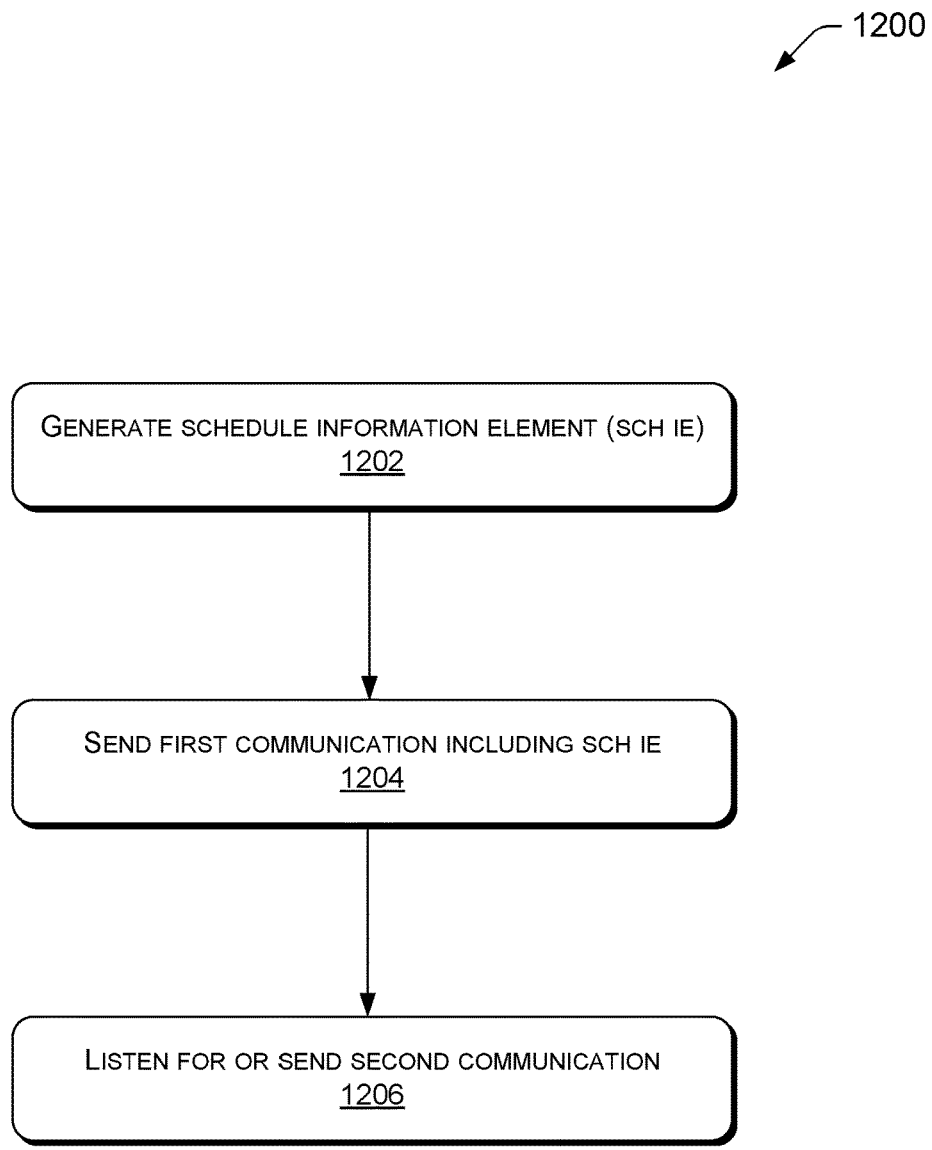
FIG. 12 illustrates an example process to generate and send a communication that includes a schedule information element.

FIG. 12 illustrates the example process 1200 to generate and send a communication that includes a schedule information element.

At 1202, a first device (e.g., the FFD 200 or the LFD 300) may generate a schedule information element regarding schedule data for a first operating context. In some instances, the first device may determine the schedule data to apply to the first operating context and then determine whether or not a second device has previously received the schedule data for a second operating context. If the second device has received schedule data that is determined to be applied to the first operating context, the first device may include a reference tag to signal to the second device to use the previously received schedule data for the first operating context. However, if the schedule data has not yet been received, the first device may include the schedule data in the schedule information element.

In some instances, if the first device determines that the schedule data is to be applied in the future, the first device may include a future transition element number in the schedule information element.

At 1204, the first device may send a first communication to the second device. The first communication may include the schedule information element and/or other information elements.

At 1206, the first device may listen for a second communication and/or send the second communication based on the first operating context and the schedule data referenced or included in the schedule information element. This may include configuring a radio of the first device to operate according to the first operating context with the schedule data having been applied thereto.

In some instances, the process 1200 may allow the first device to control a schedule of the second device. For example, the first device may act as a parent to multiple children devices. The parent device may determine unicast schedules for the children devices that indicate that the parent device will send unicast communications at different times. Here, the parent device may send schedule data regarding the unicast schedules to the children devices in schedule information elements. Each schedule information element may identify the same event reference SEB, but provide a different offset. This may synchronize the children devices to the event reference SEB. Further, this may provide different times for the parent device to send unicast communications to the children devices. Additionally, or alternatively, the parent device may schedule the children devices to receive broadcast communications at the same time. The parent device may send schedule data regarding the broadcast schedules to the children devices in schedule information elements. Each schedule information element may identify the same event reference SEB and provide the same offset. The schedule information elements for the broadcast schedules may be sent at the same time as the schedule information elements for the unicast schedules and/or at different time. As such, the parent device may efficiently schedule communications with the children devices (e.g., to avoid communication collisions, etc.).

Further, in some instances a parent device may determine an event repetition interval based on timing uncertainty of multiple children devices. For example, the parent device may determine the event repetition interval (for a specific child device or across all children devices) to be shorter than a period of time it takes for a device to fall out of synchronization. To illustrate, if a child device drifts out of synchronization relatively quickly (e.g., over less than a period of time), the parent device may set the event repetition interval to be relatively short. This may allow communications to be received by the child device and remain in sync. In other instances, a parent device may control schedules for children devices in other manners (e.g., set other types of schedules).

Figure 13:
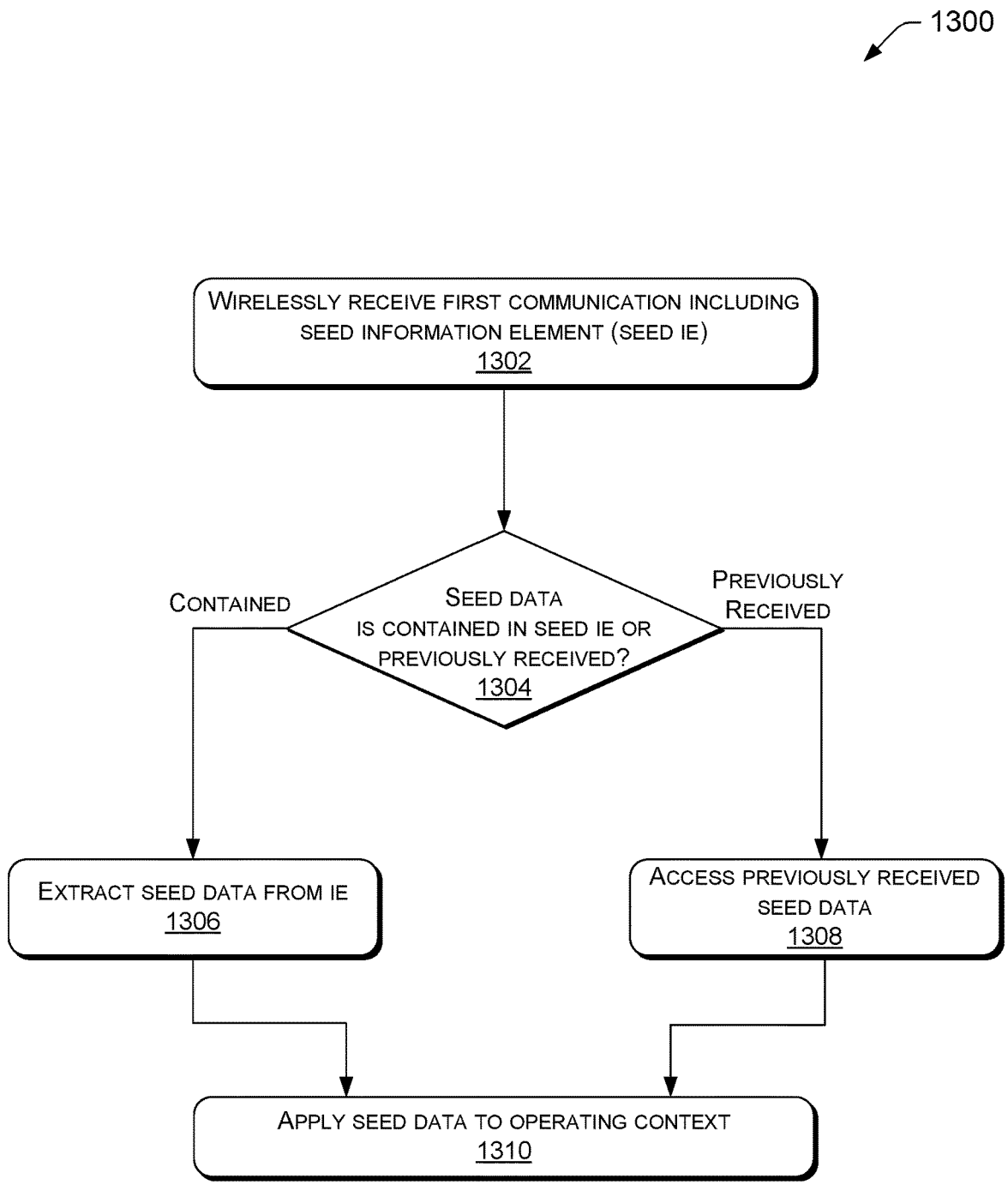
FIG. 13 illustrates an example process to apply seed data to an operating context.

FIG. 13 illustrates the example process 1300 to apply seed data to an operating context.

At 1302, a first device (e.g., the FFD 200 or the LFD 300) may wirelessly receive a first communication from a second device (e.g., the FFD 200 or the LFD 300). The first communication may include a seed information element and/or another information element. The seed information element may include and/or indicate a seed tag indicating a first operating context to which to apply seed data; a seed reference tag including one or more seed reference bits to (i) indicate whether the seed data is contained in the seed information element or has been previously received and/or (ii) identify a second operating context associated with previously received seed data to be used as the seed data; a future transition element number that indicates when to apply the seed data to the first operating context; and/or the seed data. The seed data may indicate a seed value to input into a generator function.

At 1304, the first device may determine whether the seed data is contained in the seed information element or has been previously received. This may include analyzing the seed reference tag, which may indicate whether the seed data is contained in the seed information element or has been previously received. If the seed data is included in the seed information element, the process 1300 may proceed to 1306 to extract the seed data from the seed information element. If the seed data has been previously received, the process may proceed to 1308 to access the previously received seed data. Here, the seed data may have been previously stored in memory of the first device (e.g., the memory 212 of the FFD 200 or the memory 212 of the LFD 300), and the first device may access that seed data.

In any event, whether the seed data is extracted from the seed information element or accessed from previously stored data, the first device may, at 1310, apply the seed data to the first operating context. In some instances, the first operating context may have already be established (e.g., set) on the first device (e.g., seed data may have been previously received for the first operating context). Here, the operation 1310 may include updating (e.g., replacing) the existing seed data with the seed data extracted from the seed information element or obtained from the second operating context. As such, the existing seed data may be updated with the new seed data. In other instances, the first operating context may not have been established on the first device, and the operation 1310 may include establishing the first operating context for the first device by associating the seed data with the first operating context.

If, for example, the future transition element number is specified in the seed information element, the operation

1310 may be performed to the first operating context at the channel plan or schedule element that is associated with the future transition element number. For example, the seed data may be applied to a channel plan element that is twenty elements in the future.

Figure 14:
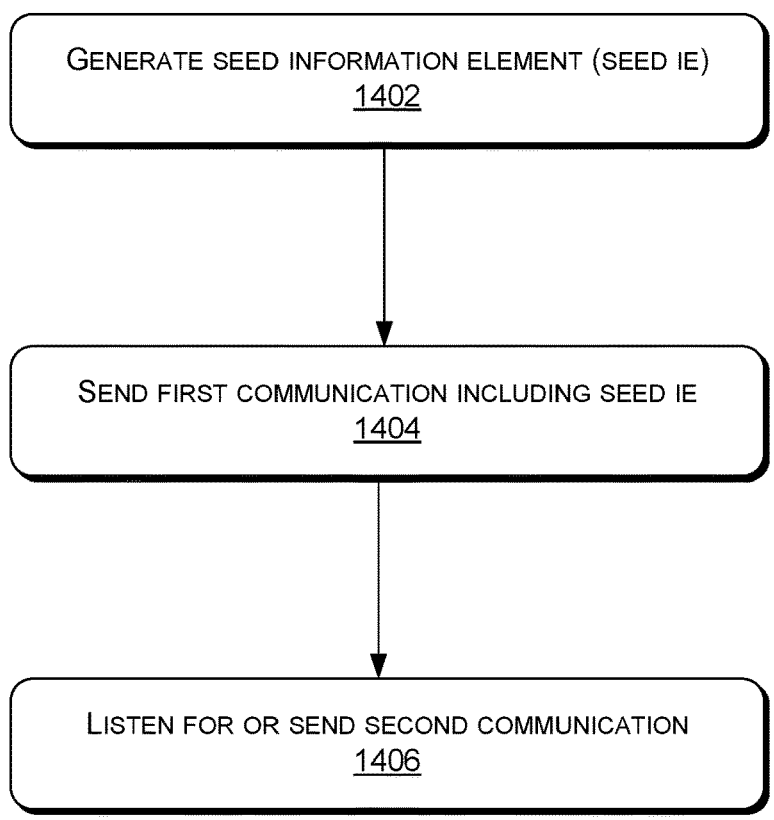
FIG. 14 illustrates an example process to generate and send a communication that includes a seed information element.

FIG. 14 illustrates the example process 1400 to generate and send a communication that includes a seed information element.

At 1402, a first device (e.g., the FFD 200 or the LFD 300) may generate a seed information element regarding seed data for a first operating context. In some instances, the first device may determine the seed data to apply to the first operating context and then determine whether or not a second device has previously received the seed data for a second operating context. If the second device has received seed data that is determined to be applied to the first operating context, the first device may include a reference tag to signal to the second device to use the previously received seed data for the first operating context. However, if the seed data has not yet been received, the first device may include the seed data in the seed information element.

In some instances, if the first device determines that the seed data is to be applied in the future, the first device may include a future transition element number in the seed information element.

At 1404, the first device may send a first communication to the second device. The first communication may include the seed information element and/or other information elements.

At 1406, the first device may listen for a second communication and/or send the second communication based on the first operating context and the seed data referenced or included in the seed information element. This may include configuring a radio of the first device to operate according to the first operating context with the seed data having been applied thereto.

A channel information element, schedule information element, seed information element, and/or any other information element discussed herein may be sent and/or received at various instances. For example, any information element may be communicated during discovery, Personal Area Network (PAN) configuration (e.g., detailing PAN specific information, such as active security key information, PAN broadcast schedule and channel information, configuration sequence number (to identify when the configuration information has changed), etc.), a PAN configuration update, a channel update process to update channel data (e.g., a channel plan), a schedule update process to update schedule data (e.g., a schedule), a seed update process to update seed data, a group acknowledgment message, etc. As such, the processes 900, 1000, 1100, 1200, 1300, and/or 1400 may be performed at a variety of times.

Further, although the processes 900, 1000, 1100, 1200, 1300, and/or 1400 are discussed as including one information element, any number of information elements may be included. In one example, multiple channel information elements may be included in a single communication to update multiple operating contexts. In another example, multiple schedule information elements may be included in a single communication to update multiple operating contexts. In yet a further example, a channel information element(s), a schedule information element(s), and a seed information element(s) may be included in a same communication.

Figure 15:
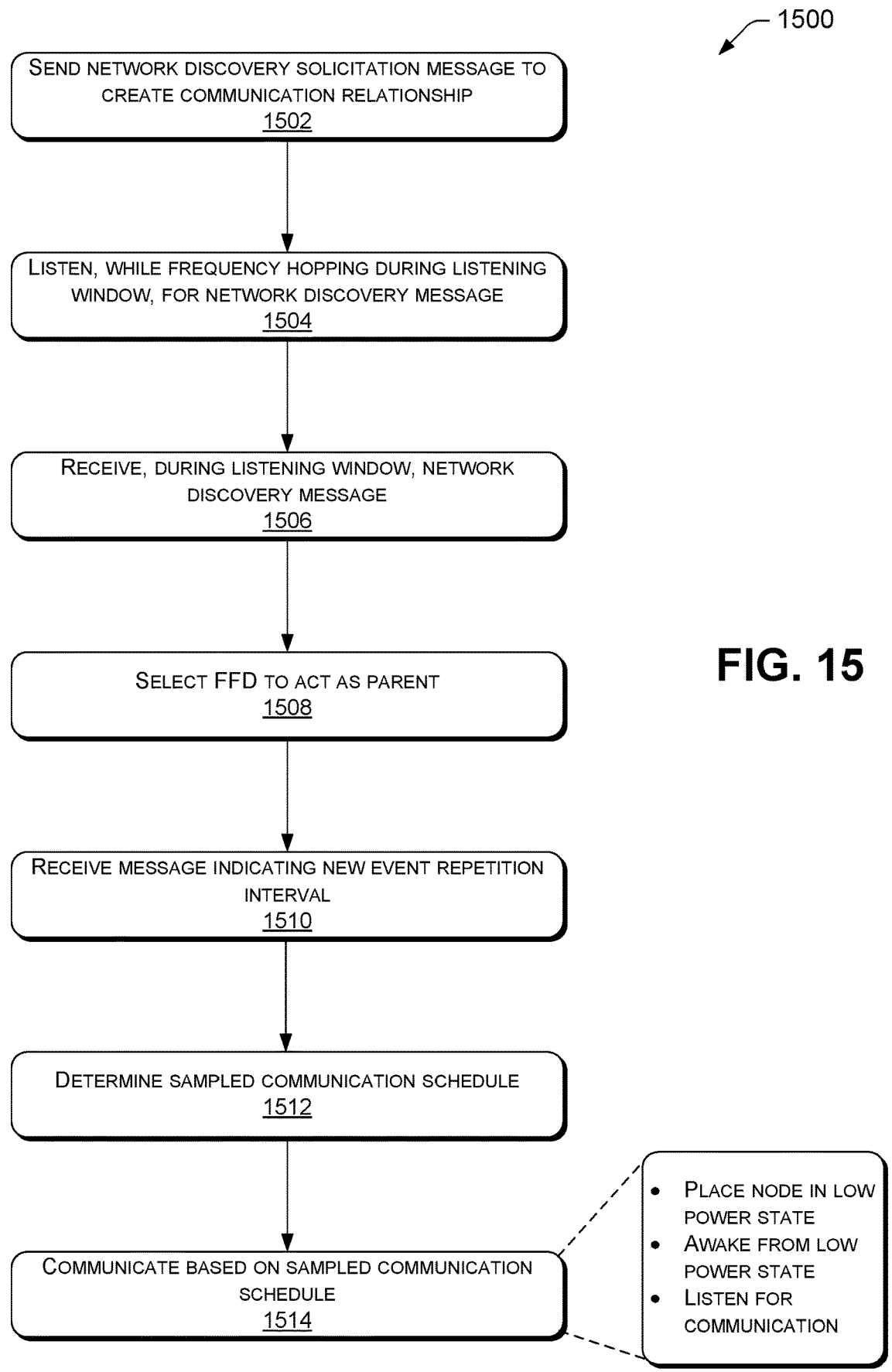
FIG. 15 illustrates an example process to join a wireless network.

FIG. 15 illustrates the example process 1500 to join a wireless network. For ease of illustration, the process 1500 is discussed in the context of being performed by a Limited Function Device (LFD), such as the LFD 300. For example, the process 1500 may be performed by an LFD desiring to associate to a parent device (e.g., establish a relationship for communications in the future). However, the process 1500 may be performed in other contexts and/or by other devices.

At 1502, the LFD may send a network discovery solicitation message to create a communication relationship. The network discovery solicitation message may be sent over multiple channels of a wireless network, such as all available channels. The network discovery solicitation message may request to create a communication relationship with a parent. The network discovery solicitation message may include a channel information element indicating a channel list and a generator function that is implemented by the LFD (e.g., information regarding a channel plan), a schedule information element including schedule data regarding a schedule of the LFD, a timing and type information element describing a current location in the schedule, a seed information element indicating a seed value to input into the generator function, a directed network discovery information element indicating a listening window, and so on.

At 1504, the LFD may listen, while frequency hopping during the listening window, for a network discovery message. The frequency hopping may be based on the channel list and the generator function that is implemented by the LFD, the schedule data regarding the schedule of the LFD, the timing information in the timing and type information element, and/or the seed value indicated in the network discovery solicitation message. In other words, the LFD may implement the generator function over the channel list, the schedule data, the timing information, and/or the seed data that was advertised at 1502 to frequency hop during the listening window. A device desiring to communicate with the LFD may also be frequency hopping during the listening window based on the same data. By exchanging information regarding the channel function, the LFD and an FFD may frequency hop during the listening window while the devices are establishing a communication relationship. In many instances, the listening window may comprise a relatively short period of time, such as less than 10 minutes, less than 5 minutes, less than 1 minute, etc.

At 1506, the LFD may receive, during the listening window, a network discovery message from a FFD. The network discovery message may that the FFD is able to serve as a parent node for the LFD. The network discovery message may be received as a unicast communication from the FFD. The network discovery message may include data for any number of operating contexts, such as a predetermined number of operating contexts, all operating context that the LFD will use going forward, a single operating context, etc. For example, the network discovery message may include a channel information element indicating a channel list and a generator function that is implemented by the FFD (or that the FFD requests that the LFD use), a schedule information element including schedule data regarding a schedule of the FFD (or that the FFD requests that the LFD use), a timing and type information element describing a current location in the schedule, a seed information element indicating a seed value to input into the generator function, and so on. In many instances, the network discovery message may enable the FFD to control a communication schedule of the LFD for a given operating context. To illustrate, the network discovery message may specify data for a broadcast operating context, data for a unicast operating context, data for a multicast operating context, and so on. Although, in many instances, the data regarding the broadcast operating context is protected and is not provided until after authentication has occurred.

In some instances, the network discovery message may include load balancing information regarding the FFD. The load balancing information may indicate an amount of load on the FFD. The amount of load may be based on a number of children devices (e.g., LFDs) that are supported by the FFD, a processor load of the FFD (e.g., an average processor load, a current processor load, etc.), and/or a radio load of the FFD (e.g., how much of the time the radio is being used). The amount of load may comprise a value (e.g., on a scale of 1 to 10), a percentage (e.g., a percentage of full capacity), a classification (e.g., no load, some load, normal load, very busy, etc.).

At 1508, the LFD may select an FFD to act as a parent. For example, if the LFD receives network discovery messages from multiple neighboring FFDs, the LFD may select a particular FFD to act as a parent device for future communication. In some instances, the LFD may select an FFD based on load balancing information from each FFD that sends a network discovery message and/or a strength of a communication link between the LFD and the respective FFD. In one illustration, the LFD may select an FFD to act as a parent when the strength of the link between the LFD and the FFD is greater than a threshold and/or the FFD is associated with less than a particular amount of load. In other illustrations, an FFD may be selected in other manners.

In some instances, the selected FFD may control the rate at which communications are exchanged initially and then update that rate for normal communications after the initial exchange. For example, during a discovery process and/or authentication process, where many communications may be exchanged to establish normal operating conditions, the FFD may cause the FFD and LFD to exchange communications relatively frequently (e.g., by sending a message that specifies a relatively short event repetition interval). After authentication data is exchanged (e.g., encryption keys, so that the devices can communicate in a secure manner), the FFD may send a message that specifies a new event repetition interval. At 1510, the LFD may receive the message with the new event repetition interval, causing communications going forward to be exchanged less frequently (e.g., by sending a message that specifies a relatively long event repetition interval). However, in other instances the FFD may cause initially communications to be exchanged infrequently, and frequently thereafter.

At 1512, the LFD may determine a sampled communication schedule based on the information in the network discovery message (e.g., channel data, schedule data, seed data, etc.). The sampled communication schedule may comprise any of the schedules discussed herein, such as a schedule shown in FIG. 7. The sampled communication schedule may generally indicate that the LFD may periodically listen for communications. For example, the schedule may include event SLRPs defined by an event offset and an event repetition interval.

At 1514, the LFD may communicate based on the sampled communication schedule. For example, the LFD may be placed in a low power state associated with less than a threshold amount of power during periods of time when communications are not expected to be transmitted to the LFD. The LFD may awake from the low power state to listen for a communication at an event SLRP (e.g., at the start of a listening period). The listening may be based on an operating context that was made known to the LFD during the process 1500 (e.g., by the network discovery message).

Figure 16:
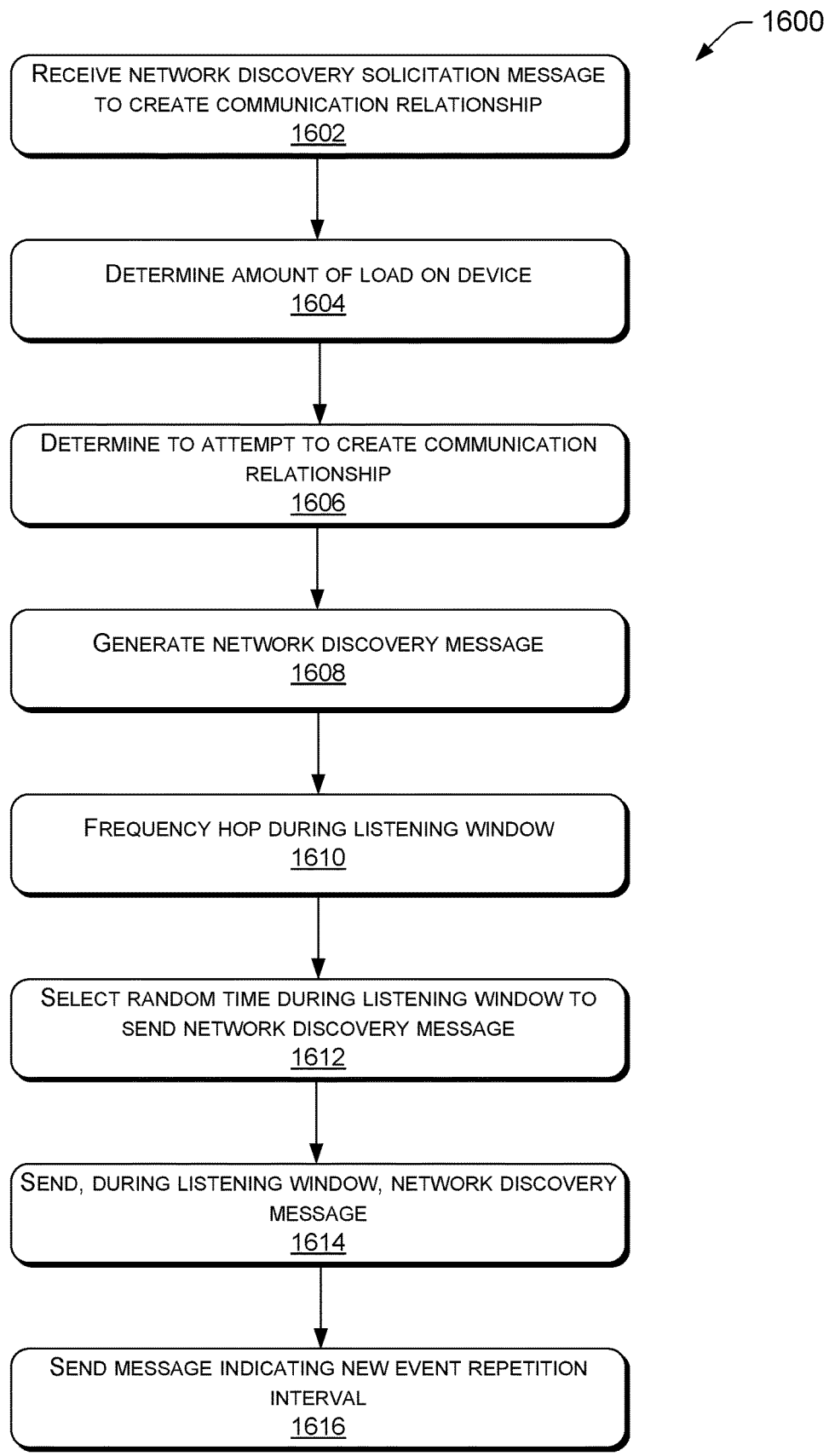
FIG. 16 illustrates an example process to discover a device in a wireless network.

FIG. 16 illustrates the example process 1600 to discover a device in a wireless network. For ease of illustration, the process 1600 is discussed in the context of being performed by a FFD, such as the FFD 200. For example, the process 1600 may be performed by an FFD that receives a communication from an LFD desiring to associate to with the FFD as a parent device. However, the process 1600 may be performed in other contexts and/or by other devices.

At 1602, the FFD may receive a network discovery solicitation message from an LFD to create a communication relationship. The network discovery solicitation message may request to create a communication relationship with the FFD as a parent. The network discovery solicitation message may include a channel information element indicating a channel list and a generator function that is implemented by the LFD, a schedule information element including schedule data regarding a schedule of the LFD, a timing and type information element, a seed information element indicating a seed value to input into the generator function, a directed network discovery information element indicating a listening window, and so on.

At 1604, the FFD may determine an amount of load on the FFD. The amount of load may be based on a number of children nodes that are supported by the FFD, a processor load on one or more processors of the FFD over a period of time, and/or a radio load on a radio of the FFD over the period of time.

At 1606, the FFD may determine to attempt to create a communication relationship. For example, if an amount of load on the FFD is less than a threshold, the FFD may determine that it can serve as a parent to the LFD. Additionally, or alternatively, the FFD may base the determination on a strength of a connection between the FFD and the LFD.

At 1608, the FFD may generate a network discovery message. This may include determining information for a channel information element, schedule information element, timing and type information element, seed information element, and so on for an operating context to be implemented by the LFD. The network discovery message may include these information elements, as well as other information elements. In some instances, the network discovery message includes load balancing information indicating an amount of load on the FFD.

At 1610, the FFD may frequency hop during the listening window based on the generator function that is implemented by the LFD and/or any other information that is provided by the LFD in the network discovery solicitation message.

At 1612, the FFD may select a random time during the listening window to send the network discovery message. This may avoid communication collisions with other FFDs that may be attempting to communicate with the LFD.

At 1614, the FFD may send, during the listening window, the network discovery message. The message may be sent at the random time selected at 1612. In many instances, the network discovery message is sent as a unicast message directly to the LFD.

Thereafter, the FFD and the LFD may communicate according to the information in the network discovery message.

In some instances, as noted above, the FFD may control the rate at which communications are exchanged initially and then update that rate for normal communications after the initial exchange. In such instances, the FFD may send, at 1616, a new event repetition interval for communicating with the FFD. The new event repetition interval may be sent after initial communications are exchanged (e.g., after authentication data is exchanged).

Figure 17:
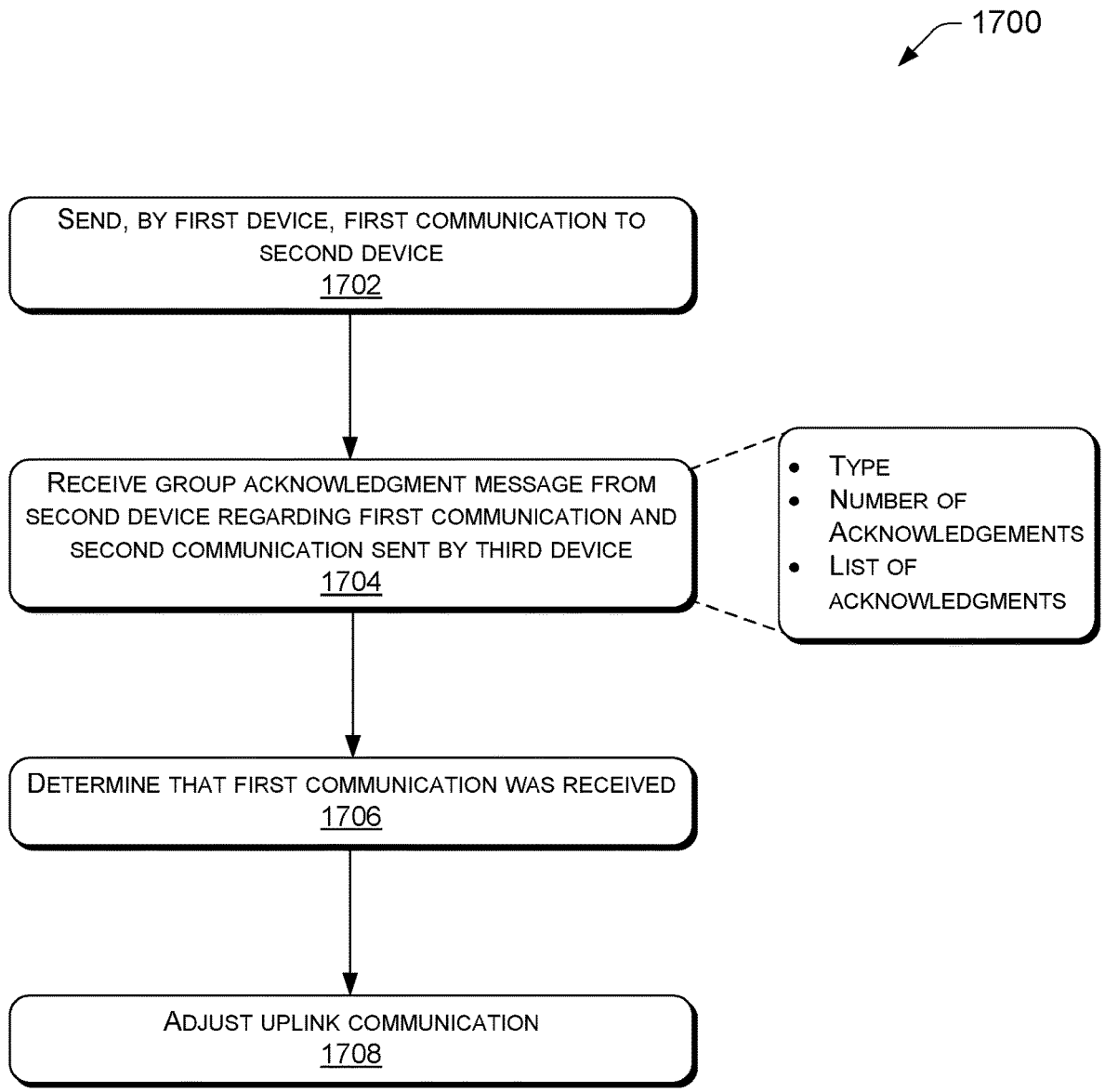
FIG. 17 illustrates an example process to determine that a communication was received based on a group acknowledgement message.

FIG. 17 illustrates the example process 1700 to determine that a communication was received based on a group acknowledgement message.

At 1702, a first device (e.g., the FFD 200 or LFD 300) may send a first communication to a second device (e.g., the FFD 200 or LFD 300) in wireless network. The first communication may include any type of a communication that is generally acknowledged by a receiving device.

At 1704, the first device may receive a group acknowledgement message from the second device. The group acknowledgment message may comprise a single message to acknowledge that communications from multiple devices were received at second device. The group acknowledgement message may have been sent as a broadcast to the first device and at least one other device.

The group acknowledgement message may generally include acknowledgments for communications from multiple devices. An acknowledgment may include a device identifier for a device that sent a communication (e.g., a Medium Access Control (MAC) address of the device, a hash of the MAC address of the device, etc.) and a communication identifier for the communication (e.g., a sequence number of the communication, a Cyclic Redundancy Check (CRC) code for the communication, etc.). In many instances, the group acknowledgment message may include a type field to indicate a type of acknowledgments in a list, a number field to indicate a number of the acknowledgements in the list, and a list field that includes the acknowledgements in the list. If multiple types of acknowledgments are included in the group acknowledgment message, the acknowledgments may be grouped by type.

At 1706, the first device may determine that the first communication was received at the second device. This may include analyzing the group acknowledgment message to determine if a communication identifier for the first communication and/or a device identifier for the first device is included in the group acknowledgment message. Since a communication identifier may not be unique across all messages, the analysis may look for the communication identifier in association with the device identifier.

In some instances, the group acknowledgment message may indicate a strength of a received communication (e.g., RSL value). In some of these instances, the first device may use this information to adjust an uplink communication, at 1708. For example, if the RSL value is below a threshold, the first device may switch to another parent device, change a power level for transmitting, and so on.

Figure 18:
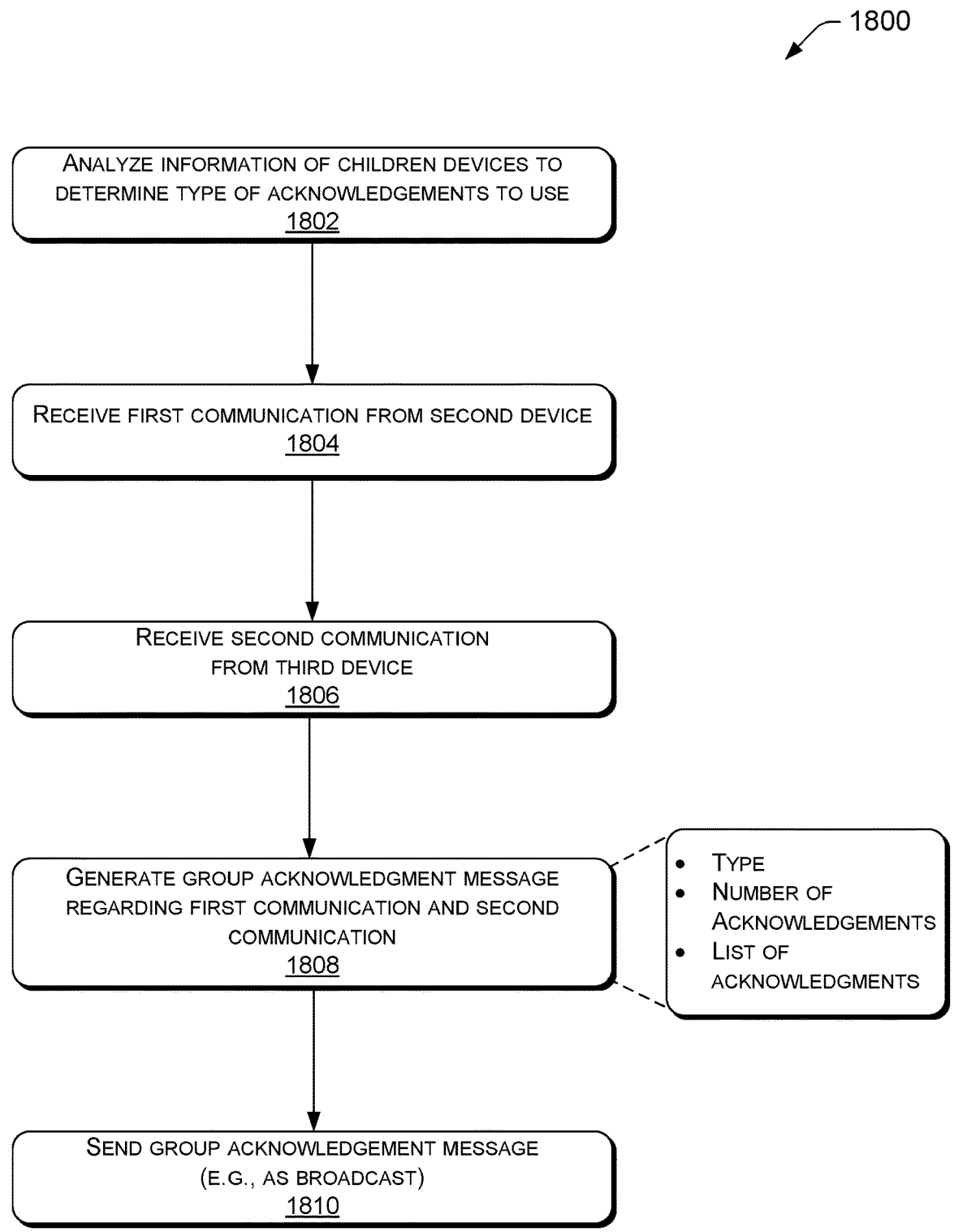
FIG. 18 illustrates an example process to generate and send a group acknowledgment message regarding communications from multiple devices.

FIG. 18 illustrates the example process 1800 to generate and send a group acknowledgment message regarding communications from multiple devices.

In some instances, a device identifier may include a hash of a MAC address or other data. On occasion, a first hash of a MAC address of a first child device (a first device identifier) and a second hash of a MAC address of a second child device (a second device identifier) result in the same value (e.g., the first device identifier and the second device identifier are the same value). If the first hash and the second hash were included in a group acknowledgment, the first child device and the second child device may not know which device is being acknowledged, since the acknowledgments may be the same.

As such, when a first device (e.g., the FFD 200 or the LFD 300) is associated with children devices, the first device may, at 1802, analyze information of the children devices to determine a type of acknowledgement to use. For example, if the first device determines that a hash of a MAC address for a first child device (e.g., a short device identifier for the first child device) is the same as a hash of a MAC address for a second child device (e.g., a short identifier for the second child device), the first device may determine to use a longer device identifier for acknowledgements (e.g., a type of acknowledgment that includes more data), such as a full MAC address. This may avoid conflicting acknowledgments (e.g., acknowledgments that include the same information). In some instances, the operation 1802 is performed before communications are received from the children devices. In other instances, the operation 1802 is performed when communications are received. In yet other instances, the operation 1802 may not be performed.

At 1804, the first device may receive a first communication from a second device, such as from a second child device.

At 1806, the first device may receive a second communication from a third device, such as a third child device. The first communication and/or the second communication may each comprise a type of communication that is generally acknowledged by a receiving device.

At 1808, the first device may generate a group acknowledgment message regarding the first communication and the second communication. The group acknowledgment message may acknowledge receipt of the first communication and the second communication at the first device. As noted above, in many instances the group acknowledgment message may include a type field to indicate a type of acknowledgments in a list, a number field to indicate a number of the acknowledgements in the list, and a list field that includes the acknowledgements in the list. In some instances, the group acknowledgment includes acknowledgments of a particular type (e.g., a long device identifier when short device identifiers for children devices are the same value). Further, in some instances the group acknowledgement message may indicate a signal strength of receiving the first communication (e.g., RSL) and/or a signal strength of receiving the second communication.

At 1810, the first device may send the group acknowledgement message. The group acknowledgment message may be sent as a broadcast to the second device, the third device, and/or any other devices that may be within communication range of the first device. That is, the group acknowledgment message may include a single message that is transmitted as a broadcast to multiple devices (in some instances, hundreds of devices).

Example Discovery Process

Figure 19:
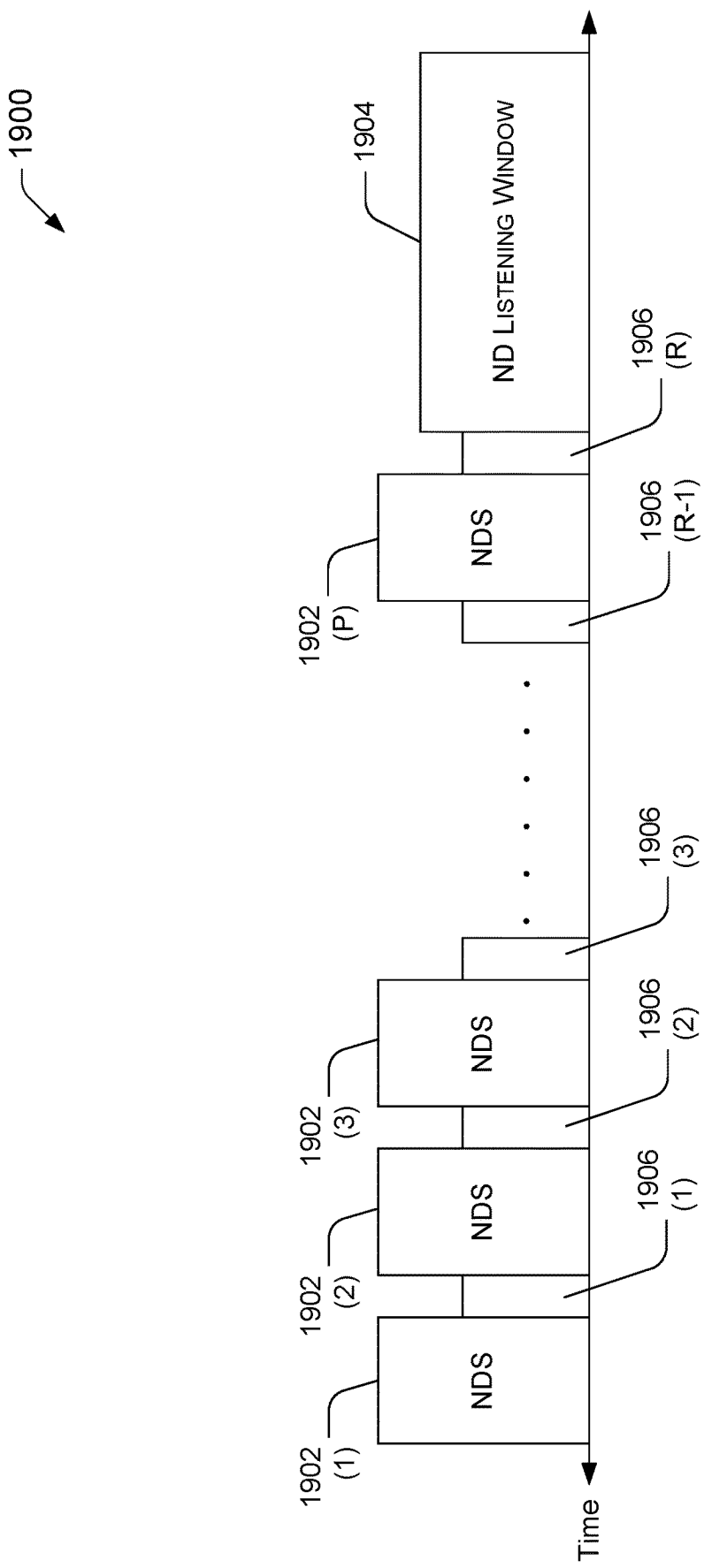
FIG. 19 illustrates example timing for a discovery process.

FIG. 19 illustrates example timing for a discovery process 1900. The process 1900 may be performed when a device desires to join a network (e.g., establish a parent-child relationship with another device). For ease of illustration, the process 1900 will be discussed in the context of an LFD and multiple FFDs. However, the process 1900 may be performed by other devices.

As illustrated, the process 1900 is associated with Network Discovery Solicitation (NDS) windows 1902(1), 1902(2), 1902(3), . . . 1902(P) and a Network Discovery (ND) listening window 1904. Each of the NDS windows 1902 and the ND listening window 1904 are separated by gaps 1906(1), 1906(2), 1906(3), . . . 1906(R−1), and 1906(R), such as Short Interframe Spacings (SIFSs). The ND listening window 1904 may be referred to as a response period, in some instances.

During the NDS windows 1902, an LFD may send Network Discovery Solicitation (NDS) messages requesting a communication relationship with an FFD. Any number of NDS messages may be sent before the ND listening window 1904 begins. In many instances, a single NDS message may be sent for each of the NDS windows 1902. An NDS message may be sent over a number of channels, such as a predetermined number of channels, all channels mentioned in a channel list, etc. An NDS message may be sent as a broadcast communication to neighbor devices.

An NDS message may generally advertise data regarding an operating context that will be used by the LFD to receive a communication during the ND listening window 1904. For example, the NDS message may include a channel information element, schedule information element, timing and type information element, seed information element, directed network discovery information element, and so on regarding the operating context. In one illustration, the LFD sends data regarding a unicast operating context that indicates when the LFD will listen for unicast communications. In particular, the NDS message may include a channel information element that describes a channel plan, a generator function, and/or a list of channels to use during the ND listening window 1904. Further, the NDS message may include a schedule information element and timing and type information element that describes a unicast schedule of the LFD, such as a schedule active period, a schedule repetition interval of a schedule element, and so on. In many instances, the schedule information element may not include event information, such as a reference schedule element boundary element number, an event offset, or an event repetition interval. The NDS message may also include a directed network discovery information element that describes the ND listening window 1904 (e.g., describes the response period). Further, the NDS message may include a seed information element that indicates a seed value. Other information elements may also be included in the NDS message to advertise the operating context in which the LFD will be operating during the listening window. Although the LFD in the above illustration sends data regarding a unicast operating context, in other illustrations the LFD may send data regarding other types of operating contexts, such as a broadcast operating context, a multicast operating context, etc. However, as noted above, in many instances data regarding a broadcast operating context is protected and is not provided until after authentication has occurred.

An FFD that receives the NDS message and decides to establish a relationship with the LFD (e.g., act as the parent), may use the data in the NDS message to attempt to communicate with the LFD. In particular, the FFD may determine when the ND listening window 1904 is, and use the data in the channel information element to frequency hop during the ND listening window 1904. The LFD also frequency hops during the ND listening window 1904 based on the same data. As such, during the ND listening window 1904, the LFD and the FFD may frequency hop according to the same sequence.

In any event, the FFD sends an ND message during the ND listening window 1904. The ND message may be sent as a unicast communication based on the unicast operating context of the LFD. In some instances, the FFD sends the ND message at a random time during the ND listening window 1904. The ND message may include data regarding any number of operating contexts. For example, the FFD may send data regarding a broadcast listening schedule for the LFD, a unicast listening schedule for the LFD, a broadcast listening schedule of the FFD, a unicast listening schedule of the FFD, a broadcast listening schedule associated with group acknowledgments, and so on. Although, as noted above, in many instances data regarding a broadcast listening schedule is protected and is not provided until after authentication has occurred. These operating contexts may be used by the LFD in future communications with the FFD. For instance, based on a unicast listening schedule for the LFD, the LFD may listen for communications from the FFD. In another instance, based on a unicast listening schedule of the FFD, the LFD may determine when it can send unicast communications to the FFD (e.g., determine when the FFD will be listening for the LFD). In some instances, an ND message may also include load balancing information for the FFD.

The LFD may receive ND messages from one or more FFDs during the ND listening window 1904. The LFD may then select an FFD to act as a parent device. The LFD may select an FFD based on a variety of factors, such as an amount of load on an FFD, a proximity of the FFD (if known), a strength of a link between the devices, and so on. In some instances, the LFD may exchange test messages with the FFD over the link to gather more reliable information about the link (e.g., more reliable information about a strength of the link).

Once an FFD is selected, the LFD may determine a sampled communication schedule to implement. This may include referencing data provided in an ND message regarding an operating context (e.g., referencing a schedule described by the data). The LFD may then enter a low power state and/or awake from the low power state according to the sampled communication schedule. For example, the LFD may awake to listen for a communication at an event sampled listening reference point (SLRP).

In some instances, if an ND message is not received during the ND listening window, the process 1900 may be repeated (e.g., send one or more NDS messages and wait for another ND listening window). Here, the other ND listening window may be lengthened (or be the same, in some instances) and/or the number of NDS messages that are sent may be increased (or be the same, in some instances).

In some instances, the LFD may retain data in ND messages from FFDs for a period of time (e.g., until clocks drift out of synchronization). If, for example, a communication relationship with an initially selected FFD is not able to be established, the LFD may reference the data to select another FFD. In a similar manner, an FFD may retain data from the LFD for a period of time, so that it may communicate with the LFD if the FFD is selected due to an initial failure to establish a communication relationship with a different FFD.

After a communication relationship is established between an LFD and an FFD, the LFD may operate according to the operating contexts that are established. Any change to an operating context may be communicated with an information element. For example, the FFD may update data for an operating context by sending an information element that indicates an update to the operating context. The information element may include a tag that identifies the operating context to update. As noted above, the information element may also reference data from another operating context and/or include the data to be used to update the operating context.

Example Information Elements

FIGS. 20-27 illustrate example information elements. In FIGS. 20-27, an information element may include one or more items (e.g., data). A number of bits that represents each item is shown along the top of the information element. Although various items are shown as being represented by a particular number of bits, such as one or more octets, any number of bits may be used to represent the various items. An item that is illustrated as including "0" bits or octets may indicate that the item is optional (e.g., may not be included in the information element in all instances). In one example, if an item is indicated as being represented by "Octets: 0/2," this indicates that the item may not be included, but is represented with two octets when included. In another example, if an item is indicated as being represented by "Octets: 0/Variable," this indicates that the item may not be included, but is represented with a variable number of octets when included. Further, although items included in an information element are illustrated in a particular order, the items may be arranged in any order.

FIG. 20 illustrates an example channel information element (CH IE) 2000. As illustrated, the CH IE 2000 includes a WP sub-IE descriptor 2002, which represents a descriptor that is assigned to the CH IE 2000. Such descriptor 2002 may be defined according to a standard, such as the Wi-SUN standard. The CH IE 2000 also include a tag 2004 indicating an operating context for channel data referenced or included in the CH IE 2000. Further, the CH IE 2000 includes a reference tag 2006 to (i) indicate whether the channel data is contained in the CH IE 2000 or has been previously received and/or (ii) identify another operating context associated with previously received channel data to be used as the channel data. For example, if the reference tag 2006 is set to "0," this may indicate that the channel data is included in the CH IE 2000. Alternatively, if the reference tag 2006 is set to a value, this may indicate that the channel data has been previously received (e.g., the channel data is associated with another operating context). Here, the value may identify the other operating context. In some instances, the CH IE 2000 also includes a future transition element number 2008 that indicates when to apply the channel data to the operating context identified by the tag 2004. In many instances, the future transition element number 2008 may identify a schedule element. Although, in some instances the future transition element number 2008 may identify a channel plan element.

In some instance, the CH IE 2000 may also include the channel data. In particular, the channel data may include and/or indicate a channel plan 2010 (or channel plan type), a Pseudo-Random Generator function (PRG) 2012 (also referred to as a generator function), an excluded channel control 2014, and/or channel information 2016. The channel plan 2010 may indicate whether data regarding a channel plan, channel spacing, and/or number of channel fields will be included in the CH IE 2000. The PRG 2012 may indicate a generator function for generating a channel plan (e.g., direct hash, etc.) for the operating context identified by the tag 2004. The excluded channel control 2014 may indicate whether a list of excluded channels is included in the CH IE 2000. The channel information 2016 may include a regulatory domain field indicating a regulatory domain value, an operating class field indicating an operating class value for the regulatory domain, a CH0 field indicating a frequency of a channel plan's channel 0, a channel spacing field indicating a spacing of a channel element in a channel plan, a number of channels field indicating a number of available channels in a channel plan (including any excluded channels), a fixed channel field indicating a single channel from within a channel plan that is used for transmitting, a channel hop count field indicating a number of channels in a devices defined hop sequence, a channel hop list field indicating channels visited in a device's hop sequence (and/or an order of the channels visited), an excluded channel ranges field indicating a range of channels that are not visited within a devices channel hop sequence (e.g., indicates channels that are excluded), an excluded channel mask field indicating (for all channels within a device's channel hop sequence) those channels that are visited and those channels that are not, and so on. In many instances, the information in the channel information 2016 may indicate a list of channels (e.g., a list of available channels) and/or a channel plan.

FIG. 21 illustrates an example schedule information element (SCH IE) 2100. As illustrated, the SCH IE 2100 includes a WP sub-IE descriptor 2102, which represents a descriptor that is assigned to the SCH IE 2100. Such descriptor 2102 may be defined according to a standard, such as the Wi-SUN standard. The SCH IE 2100 also includes a tag 2104 indicating an operating context for schedule data referenced or included in the SCH IE 2100. Further, the SCH IE 2100 includes a reference tag 2106 to (i) indicate whether at least a portion of the schedule data is contained in the SCH IE 2100 and/or has been previously received and/or (ii) identify another operating context associated with a previously received schedule data to be used as at least the portion of the schedule data. For example, if the reference tag 2106 is set to "0," this may indicate that the schedule data is included in the SCH IE 2100. Alternatively, if the reference tag 2106 is set to a value, this may indicate that the schedule data has been previously received (e.g., the scheduled data is associated with another operating context). Here, the value may identify the other operating context. In some instances, the reference tag 2106 may only reference a particular type of schedule data (e.g., a schedule active period and/or a schedule repetition interval). In other instances, the reference tag 2106 may reference any type of schedule data.

In some instances, the SCH IE 2100 includes a future transition element number 2108 that indicates when to apply the schedule data to the operating context identified by the tag 2104. In many instances, the future transition element number 2108 may identify a schedule element. Although, in some instances the future transition element number 2108 may identify a channel plan element.

In some instance, the SCH IE 2100 may also include the schedule data. The schedule data may include and/or indicate a schedule active period 2110 comprising a duration of time of an active period within a schedule element during which a device listens for communications; a schedule Repetition Interval (RI) 2112 comprising a duration of time of a schedule element; a reference Schedule Element Boundary (SEB) element number 2114 comprising a schedule element number for a particular schedule element selected to serve as an event reference, where a start of the particular schedule element may comprise an event reference SEB; an event offset 2116 comprising a duration of time from the event reference SEB to an event sampled listening reference point (SLRP); and/or an event RI 2118 comprising a duration of time between successive event SLRPs.

In some instance, the event offset 2116 and/or the event RI 2118 are sent only for a particular operating context (e.g., an LFD unicast operating context and/or an LFD broadcast operating context). In other instances, the event offset 2116 and/or the event RI 2118 are sent for other operating contexts.

FIG. 22 illustrates an example Seed Information Element (Seed IE) 2200. As illustrated, the Seed IE 2200 includes a WP sub-IE descriptor 2202, which represents a descriptor that is assigned to the Seed IE 2200. Such descriptor 2202 may be defined according to a standard, such as the Wi-SUN standard. The Seed IE 2200 also includes a tag 2204 indicating an operating context for seed data referenced or included in the Seed IE 2200. Further, the Seed IE 2200 includes a reference tag 2106 to (i) indicate whether the seed data is contained in the Seed IE 2200 or has been previously received and/or (ii) identify another operating context associated with a previously received seed data to be used as the seed data.

In some instances, the Seed IE 2200 includes a future transition element number 2208 that indicates when to apply the seed data to the operating context identified by the tag 2204. In many instances, the future transition element number 2208 may identify a schedule element. Although, in some instances the future transition element number 2208 identifies a channel plan element.

In some instances, the Seed IE 2200 includes the seed data. The seed data may comprise a seed 2210. The seed 2210 may indicate a seed value to input into a generator function used to create a channel plan. The seed value may comprise a random value, a predetermined value, a MAC address, etc. In some instances, a particular operating context may be associated with a particular seed value. That is, the particular operating context may be implemented with the particular seed value. If information about the particular operating context is advertised, the particular seed value may be advertised.

FIG. 23 illustrates an example Timing and Type Information Element (TT IE) 2300. As illustrated, the TT IE 2300 includes an IE descriptor 2302, which represents a descriptor that is assigned to the TT IE 2300. Such descriptor 2302 may be defined according to a standard, such as the Wi-SUN standard. The TT IE 2300 also includes a sub ID 2304 that represents an identifier for the TT IE 2300. Such sub ID 2304 may be defined according to a standard, such as the Wi-SUN standard. Further, the TT IE 2300 indicates a frame type 2306 of a frame in which the TT IE 2300 is contained. The frame type 2306 may indicate that the TT IE 2300 is carried in an ND frame, an NDS frame, a LFD PAN Configuration (LPC) frame, and a LFD PAN Configuration Solicitation (LPCS) frame, a Radio Frequency (RF) test frame, or any other type of frame in which the TT IE 2300 is carried.

Moreover, the TT IE 2300 includes a tag 2308 indicating an operating context for timing data referenced or included in the TT IE 2300. Additionally, the TT IE 2300 may include an element 2310 that indicates an element of a schedule (that is associated with the operating context identified by the tag 2308) in which the Frame Reference Time (FRT) of a frame carrying the TT IE 2300 falls. The FRT may refer to a reference point in the frame structure to which timing is referred. Further, the TT IE 2300 may include a Fractional Element Time (FET) 2312 (e.g., the portion of the element duration up to the FRT). In some instances, the FET 2312 may be defined as: FET=floor (((current time−element SEB)*2^16)/schedule RI), where all times are in milliseconds, the event SEB is the SEB of the element 2310, and the schedule RI is the value of the RI of the schedule that is associated with the operating context identified by the tag 2308.

Figure 24:
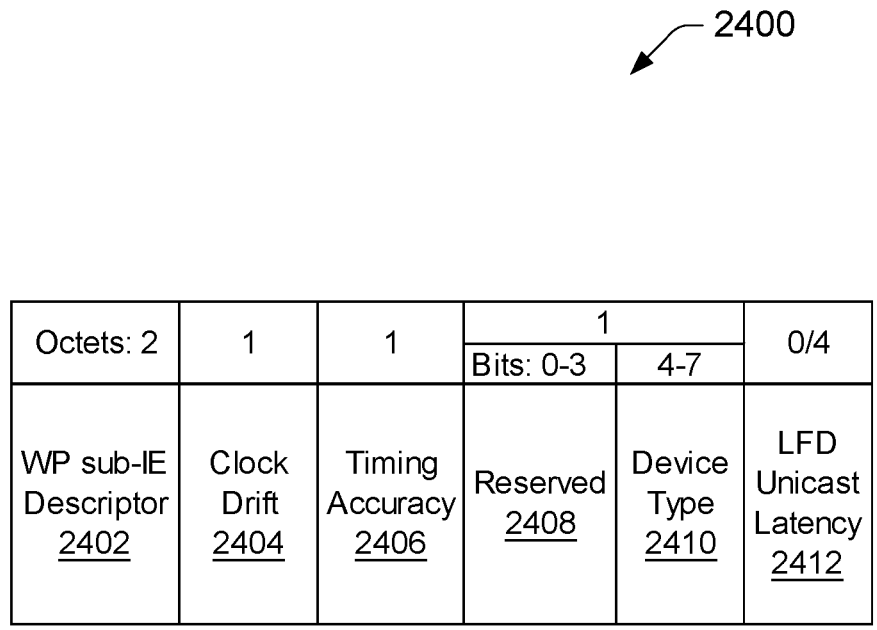
FIG. 24 illustrates an example Device Type Information Element (DType IE).

FIG. 24 illustrates an example Device Type Information Element (DType IE) 2400. The DType IE 2400 may provide information about a device type and capabilities. In some instances, information in the DType IE 2400 may be used to determine timing uncertainty associated with a device.

As illustrated, the DType IE 2400 includes a WP sub-IE descriptor 2402, which represents a descriptor that is assigned to the DType IE 2400. Such descriptor 2402 may be defined according to a standard, such as the Wi-SUN standard. The DType IE 2400 also indicates a clock drift 2404 for a device (e.g., the device that sends the DType IE 2400). For example, the clock drift 2404 may represent a reporting device's worst drift of a clock that it uses to measure its frequency hopping dwell interval. The DType IE 2400 may also indicate a timing accuracy 2406 of a device (e.g., the device that sends the DType IE 2400). For example, the timing accuracy 2406 may indicate accuracy of time values generated by the device. Further, a reserved field 2408 of the DType IE 2400 may be reserved for various information. The DType IE 2400 may additionally indicate a device type 2410 of a device that sends the DType IE 2400. The device type 2410 may indicate whether the device is a router (e.g., border router), FFD, LFD, etc. As illustrated, the DType IE 2400 also indicates an LFD unicast latency 2412 comprising a maximum delay (e.g., in milliseconds) before an available message received by the LFD parent is transmitted on the LFD unicast event. In some instances, the LFD unicast latency 2412 is present if the device type 2410 identifies an LFD.

Figure 25:
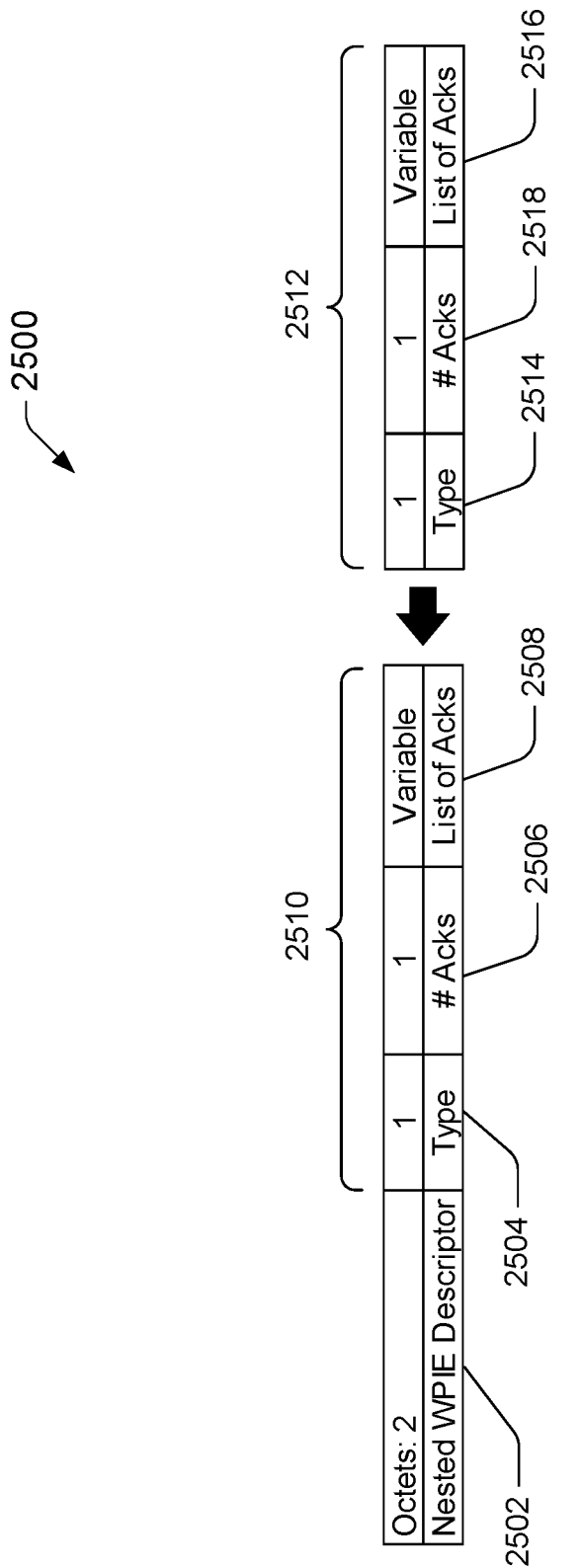
FIG. 25 illustrates an example Group Acknowledgment Information Element (GACK IE).

FIG. 25 illustrates an example Group Acknowledgment Information Element (GACK IE) 2500. The GACK IE 2500 may be used to acknowledge communications from multiple devices.

As illustrated, the GACK IE 2500 includes a Nested WP IE Descriptor 2502, which represents a descriptor that is assigned to the GACK IE 2500. Such descriptor 2502 may be defined according to a standard, such as the Wi-SUN standard. The GACK IE also includes a type field 2504, a number field 2506 (e.g., number of acknowledgments), and a list field 2508 (e.g., list of acknowledgments). The type field 2504 indicates a type of acknowledgements in the list field 2508. The number field 2506 indicates a number of the acknowledgements in the list field 2508. Further, the list field 2508 includes a list of the acknowledgments.

Each acknowledgment in the list field 2508 may indicate that a communication was received. An acknowledgment may generally include a device identifier for a device that is being acknowledged (e.g., the device that sent a communication) and a communication identifier for the communication that is being acknowledged. The device identifier may include a Medium Access Control (MAC) address of the device (e.g., 64 bits), a hash of the MAC address of the device (e.g., 16 bits), or any other data that may identify the device. The communication identifier may include a sequence number of the communication (e.g., frame sequence number) (e.g., 8 bits), a Cyclic Redundancy Check (CRC) code for the communication, or any other data that may identify the communication. In some instances, an acknowledgment may indicate a strength of a received signal (e.g., Received Signal Level (RSL)) (e.g., 8 bits) for a communication that is being acknowledged.

As noted above, each acknowledgment in the GACK IE 2500 may be associated with a type. A type may indicate how an acknowledgment is represented, such as a format of the acknowledgment. For example, an acknowledgment may be represented as a first type—a MAC address (e.g., 64 bits) and a sequence number (e.g., 8 bits); a second type—a hash of a MAC address (e.g., 16 bits) and a sequence number; a third type—a MAC address and a CRC code; a fourth type—a hash of a MAC address and a CRC code, a sixth type—a MAC address, a sequence number, and a strength of a received signal (e.g., RSL, which may be indicated with 8 bits or another number of bits); a seventh type—a hash of a MAC address, a sequence number, and an RSL; an eighth type—a combination of any of the above noted types; so on. As such, acknowledgments may be represented in different formats (e.g., types), with some formats being longer (e.g., including more bits) than other formats.

In one illustration, the type field 2504 of the GACK IE 2500 may indicate that the list field 2508 is associated with acknowledgments of the first type noted above (e.g., a MAC address and a sequence number). The number field 2506 may indicate that three acknowledgments are included in the list field 2508. The three acknowledgments may be listed in the list field 2508 as: (1) a MAC address for a first device that sent a first communication and a sequence number for the first communication; (2) a MAC address for a second device that sent a second communication and a sequence number for the second communication; and (3) a MAC address for a third device that sent a third communication and a sequence number for the third communication. In this illustration, each acknowledgment includes a combination of a MAC address and a sequence number.

As shown in FIG. 25, the GACK IE 2500 may group acknowledgements by type. That is, the type field 2504, the number field 2506, and the list field 2508 may be associated with the same type of acknowledgments. If acknowledgments of a second, different type of acknowledgments are included in the GACK IE 2500, an additional type field, number field, and list field may be included. If acknowledgments of a third, different type of acknowledgments are included in the GACK IE 2500, a further type field, number field, and list field may be included. This may be repeated for any number of types.

To illustrate, a first group of acknowledgments 2510 associated with a first type may be included in a first continuous portion of the GACK IE 2500. Further, a second group of acknowledgments 2512 associated with a second type may be included in a second continuous portion of the GACK IE 2500. The first group of acknowledgments 2510 may begin with the type field 2504 indicating that the acknowledgments in the list field 2508 are each of the first type. Further, the second group of acknowledgments 2512 may begin with a type field 2514 indicating that the acknowledgments in a list field 2516 are each of the second type. A number field 2518 may indicate a number of the acknowledgments in the list field 2516. As such, the first portion of the GACK IE 2500 includes a single field (the field 2504) to indicate the first type of acknowledgements in the list field 2508 and the second portion of the GACK IE 2500 includes a single field (the field 2514) to indicate the second type of acknowledgements in the list field 2516.

Although various items are shown in the GACK IE 2500 to indicate specific information, any of the items may be used to indicate information. For example, the descriptor 2502 may be used in some instances to indicate information of the fields 2504, 2506, and/or 2508. For example, the descriptor 2502 may indicate that all acknowledgments in the GACK IE 2500 are associated with a particular type. Here, the type field 2504 may be eliminated.

FIG. 26 illustrates an example Load Balancing Information Element (LB IE) 2600. The LB IE 2600 may be used to send information regarding an amount of load on a device. For example, the LB IE 2600 may provide information regarding a current number of FFDs and/or LFD devices routed by a transmitting device.

As illustrated, the LB IE 2600 includes a WP sub-IE Descriptor 2602, which represents a descriptor that is assigned to the LB IE 2600. Such descriptor 2602 may be defined according to a standard, such as the Wi-SUN standard. The LB IE 2600 also includes a number of FFDs field 2604 that indicates a number of 1-hop neighbors for which a device is acting as a router. In other words, the number of FFDs field 2604 may indicate how many FFD neighbors are heard through a direct link. Further, the LB IE 2600 includes a number of LFDs field 2608 that indicates a number of children devices for which a device is currently acting as a parent (e.g., a number of children LFDs that an FFD is supporting).

Although not illustrated in FIG. 26, in some instances the LB IE 2600 may additionally, or alternatively, indicate other information regarding a load on a device, such as a processor load of the device (e.g., an average processor load, a current processor load, etc.), a radio load on the device (e.g., how much of the time the radio is being used), and so on.

FIG. 27 illustrates an example Directed Network Discovery Information Element (DND IE) 2700. In some instances, the DND IE 2700 may be used during discovery to provide information regarding a listening window. The DND IE 2700 may also include information to quality a potential FFD to be able to reply.

As illustrated, the DND IE 2700 includes a WP sub-IE Descriptor 2702, which represents a descriptor that is assigned to the DND IE 2700. Such descriptor 2702 may be defined according to a standard, such as the Wi-SUN standard. The DND IE 2700 also includes a rank field 2704 that indicates a rank value (e.g., maximum value) permitted for a recipient of the DND IE 2700 to respond. In one example, the rank field 2704 may specify the maximum permitted rank an FFD may have in order to be permitted to reply. Further, the DND IE 2700 includes a response threshold field 2706 that indicates a value of a minimum LQI level at which a frame carrying the DND IE 2700 is received to permit a response. In one example, the response threshold field 2706 may specify a minimum signal quality with which the frame carrying the DND IE 2700 is received by an FFD in order for the FFD to be permitted to reply. The DND IE 2700 also includes a response interval field 2708 that indicates a time (e.g., in milliseconds) from a Frame Reference Time (FRT) of a frame carrying the DND IE 2700 at which a device will begin to listen for responses. In other words, the response interval field 2708 may indicate when a Network Discovery (ND) listening window may begin. Moreover, the DND IE 2700 includes a response period field 2710 that indicates a time (e.g., in milliseconds) during which a device will listen for responses. In other words, the response period field 2710 may indicate a duration of time of an ND listening window.

Information Element Chart

FIG. 28 illustrates a chart 2800 that indicates examples when various information elements may be used. The chart 2800 illustrates just some of the many instances where the information elements may be included. In other instances, the information elements may be used in other contexts. Further, the chart 2800 includes a few of the many types of information elements. As such, other types of information elements may be included in the frames.

In the chart 2800, an "X" indicates that an information element is included in a frame. In some instances, the "X" indicates a requirement to include the information element, while in other instances the "X" indicates that the information element may be included, if needed. Although the chart 2800 indicates that certain frames include certain information elements, in other instances an information element may be included in any type of frame.

In the chart 2800, different types of frames are indicated across the top (excluding the "Order" identifier), while different type of Information Elements (IEs) are indicated on a second column from the left. A "frame" in many instances herein may be referred to as a "message." As noted above, the chart 2800 may identify the IEs that are included in a frame. For example, a Network Discovery Solicitation "NDS" frame may include a Timing and Type (TT) IE, a Channel (CH) IE, a Directed Network Discovery (DND) IE, a Device Type (DType) IE, a Schedule (SCH) IE, and a Seed IE. An ND frame may include a TT IE, a CH IE, a DType IE, a SCH IE, and a Seed IE. An LFD PAN Configuration Solicitation (LPCS) frame may include a TT IE and a SCH IE. An LFD PAN Configuration (LPC) frame may include a TT IE, a CH IE, and a SCH IE. A Data frame may include a TT IE and a SCH IE. In many instances, the NDS and ND frames may be sent during discovery, as discussed herein. The LPCS and LPC frames may be sent during PAN configuration. The Data frame may be sent any time data is to be exchanged.

In some instances, a frame may include multiple IEs of the same type. For instance, an ND frame may include a first set of IEs for a first operating context (e.g., a CH IE, SCH IE, and Seed IE for the first operating context) and a second set of IEs for a second operating context (e.g., a CH IE, SCH IE, and Seed IE for the second operating context). If the first operating context and the second operating context are to be implemented with the same data (e.g., the same channel plan or same schedule), the second set of IEs may reference data in the first set of IEs.

As also illustrated in FIG. 28, an "Order" column indicates a precedence that an IE takes relative to other IEs of the same type (e.g., WH-IE or WP-sub-IE). A lower number may indicate a higher precedence (e.g., that the IE is positioned first in the frame). For example, a DND IE or DType IE may be included first in a frame over a CH IE.

What is claimed is:

1. A method of acknowledging multiple communications, the method comprising:
    wirelessly sending, by a first node, a first communication to a second node in a wireless network, the second node having a parent-child relationship with the first node;
    wirelessly receiving, by the first node, a group acknowledgement message from the second node, the group acknowledgement message including:
        a type field to indicate a device identifier format and a communication identifier format for acknowledgments in a list of acknowledgements,
        a number field to indicate a number of the acknowledgements in the list of acknowledgements, and
        a list field that includes the acknowledgements in the list of acknowledgements, the list field including:
            a first acknowledgement including (i) a communication identifier, according to the communication identifier format, for the first communication and (ii) a device identifier, according to the device identifier format, for the first node, the communication identifier for the first communication comprising at least one of a sequence number of the first communication or a Cyclic Redundancy Check (CRC) code for the first communication, the device identifier for the first node comprising at least one of a Medium Access Control (MAC) address of the first node or a hash of the MAC address of the first node; and
            a second acknowledgement including (i) a communication identifier, according to the communication identifier format, for a second communication received by the second node from a third node and (ii) a device identifier, according to the device identifier format, for the third node, the third node having a parent-child relationship with the second node, the communication identifier for the second communication comprising at least one of a sequence number of the second communication or a CRC code for the second communication, the device identifier for the third node comprising at least one of a MAC address of the third node or a hash of the MAC address of the third node; and
    determining, by the first node, that the first communication was received by the second node based at least in part on the group acknowledgement message.

2. The method of claim 1, wherein:
    the type field comprises a first type field and the list of acknowledgments comprises a first list of acknowledgements;
    the device identifier format comprises a first device identifier format and the communication identifier format comprises a first communication identifier format and
    the group acknowledgement message further includes (i) a second type field indicating a second device identifier format and a second communication identifier format for acknowledgments in a second list of acknowledgements, and (ii) the acknowledgments in the second list of acknowledgements each being formatted according to the second device identifier format and the second communication identifier format.

3. The method of claim 1, wherein at least one of a device format or the communication identifier format indicate a bit length for the acknowledgements in the list of acknowledgements.

4. The method of claim 1, wherein the first node comprises a battery powered device and the second node comprises a mains powered device.

5. One or more computer-readable media storing computer-readable instructions that, when executed, instruct a processing unit of a first node to perform operations comprising:
    sending a first communication to a second node in a wireless network, the second node having a parent-child relationship with the first node;
    receiving a group acknowledgement message from the second node, the group acknowledgement message having:
        a first portion that indicates a first type of acknowledgments in a first list of acknowledgements, a number of the acknowledgements in the first list of acknowledgements, and the acknowledgements in the first list of acknowledgements, at least one of the acknowledgments in the first list of acknowledgements indicating that the first communication was received; and
        a second portion that indicates a second type of acknowledgments in a second list of acknowledgements, a number of the acknowledgements in the second list of acknowledgements, and the acknowledgements in the second list of acknowledgements, each of the acknowledgments in the second list of acknowledgements having more or less bits than each of the acknowledgements in the first list of acknowledgements; and
    determining that the first communication was received by the second node based at least in part on the group acknowledgement message,
    wherein the acknowledgments in the first list of acknowledgements include:
        a first acknowledgement associated with the first type of acknowledgements, the first acknowledgment indicating a sequence number for the first communication and a device identifier for the first node; and a second acknowledgement associated with the second type of acknowledgements, the second acknowledgment indicating a sequence number for a second communication received by the second node from a third node and a device identifier for the third node, the third node having a parent-child relationship with the second node.

6. The one or more computer-readable media of claim 5, wherein the device identifier for the first node includes at least one of a Medium Access Control (MAC) address of the first node or a hash of the MAC address of the first node.

7. The one or more computer-readable media of claim 5, wherein the first node comprises a limited function device and the second node comprises a full function device.

8. The one or more computer-readable media of claim 5, wherein the group acknowledgement message indicates a signal strength of receiving the first communication by the second node, and the operations further comprise:
adjusting uplink communication based at least in part on the signal strength.

9. The one or more computer-readable media of claim 5, wherein the first type of acknowledgements indicates that the acknowledgements in the first list of acknowledgements are each associated with a first format and the second type of acknowledgements indicates that the acknowledgements in the second list of acknowledgements are each associated with a second format.

10. The one or more computer-readable media of claim 9, wherein the first format is a longer data format than the second format.

11. The one or more computer-readable media of claim 9, wherein:
the first format includes a first combination of a first Medium Access Control (MAC) address, a hash of the first MAC address, a first sequence number, or a first Cyclic Redundancy Check (CRC) code; and
the second format includes a second combination of a second MAC address, a hash of the second MAC address, a second sequence number, or a second CRC code.

12. The one or more computer-readable media of claim 5, wherein the first portion is a continuous portion of the group acknowledgement message and the second portion is a continuous portion of the group acknowledgement message.

13. The one or more computer-readable media of claim 5, wherein the first portion of the group acknowledgement message includes a single field to indicate the first type of acknowledgements in the first list of acknowledgements and the second portion of the group acknowledgement message includes a single field to indicate the second type of acknowledgements in the second list of acknowledgements.

14. A device comprising:
a radio configured to:
transmit a first communication; and
receive a group acknowledgement message from a first node in a wireless network, the first node having a parent-child relationship with the device, the group acknowledgement message having:

a first portion that indicates a number of acknowledgements in a first list of acknowledgements and the acknowledgements in the first list of acknowledgements, at least one acknowledgement of the acknowledgments in the first list of acknowledgements indicating that the first communication was received and the at least one acknowledgment including a first device identifier and a first communication identifier; and a second portion that indicates a number of acknowledgements in a second list of acknowledgements and the acknowledgements in the second list of acknowledgements, at least one acknowledgment of the acknowledgements in the second list of acknowledgements including a second device identifier and a second communication identifier of a second node having a parent-child relationship with the first node, at least one of the first device identifier being in a different format than the second device identifier or the first communication identifier being in a different format than the second communication identifier; and one or more processors communicatively coupled to the radio; and memory communicatively coupled to the one or more processors, the memory storing one or more instructions that, when executed by the one or more processors, cause the one or more processors to perform operations comprising:
determining that the first communication was received by the first node based at least in part on the group acknowledgement message.

15. The device of claim 14, wherein:
the first communication identifier includes a sequence number for the first communication;
the first device identifier identifies the device;
the second communication identifier includes a sequence number for a second communication received by the first node from the second node; and
the second device identifier identifies the second node.

16. The device of claim 14, wherein the first device identifier includes at least one of a Medium Access Control (MAC) address of the device or a hash of the MAC address of the device.

17. The device of claim 14, wherein the device comprises a limited function device and the first node comprises a full function device.

18. The device of claim 14, wherein the group acknowledgement message indicates a signal strength of receiving the first communication by the first node, and the operations further comprise:
adjusting uplink communication based at least in part on the signal strength.

19. The device of claim 14, wherein at least one of the first device identifier includes a different number of bits than the second device identifier or the first communication identifier includes a different number of bits than the second communication identifier.

* * * * *